United States Patent [19]
Yamada et al.

[11] Patent Number: 5,448,300
[45] Date of Patent: Sep. 5, 1995

[54] IMAGE SIGNAL PROCESSING APPARATUS FOR PROCESSING MULTIPLEX IMAGE SIGNAL FORMATS

[75] Inventors: Masahiro Yamada, Kawasaki; Hiroyuki Iga, Yokohama; Kiyoshi Hoshino, Yokohama; Naoki Akamatsu, Yokohama; Kenichi Tokoro, Yokohama; Hisao Shimazaki, Tokyo, all of Japan

[73] Assignee: Kabushiki Kaisha Toshiba, Kawasaki, Japan

[21] Appl. No.: 77,753

[22] Filed: Jun. 16, 1993

[30] Foreign Application Priority Data

| | | | |
|---|---|---|---|
| Jun. 16, 1992 | [JP] | Japan | 4-156984 |
| Jun. 16, 1992 | [JP] | Japan | 4-156985 |
| Jun. 16, 1992 | [JP] | Japan | 4-156986 |
| Jun. 16, 1992 | [JP] | Japan | 4-156987 |
| Jun. 16, 1992 | [JP] | Japan | 4-156988 |
| Jun. 16, 1992 | [JP] | Japan | 4-156989 |

[51] Int. Cl.⁶ ............... H04N 5/14; H04N 7/12
[52] U.S. Cl. ..................... 348/571; 348/572; 348/614; 348/721; 348/714; 348/390; 348/705
[58] Field of Search ............... 358/160, 167, 166, 133, 358/181, 261.1; H04N 7/12, 5/14; 375/122; 341/67, 65; 348/440, 571, 572, 614, 607, 618, 641, 705, 708, 716, 714, 717, 721, 390, 384, 387

[56] References Cited

U.S. PATENT DOCUMENTS

| | | | |
|---|---|---|---|
| 4,954,892 | 9/1990 | Asai | 358/133 |
| 5,227,788 | 7/1993 | Johnston | 341/65 |

FOREIGN PATENT DOCUMENTS

| | | |
|---|---|---|
| 0449075 | 10/1991 | European Pat. Off. . |
| 0529442 | 3/1993 | European Pat. Off. . |
| 4256294 | 9/1992 | Japan . |

OTHER PUBLICATIONS

Patent Abstracts of Japan, vol. 16, No. 403 (E-1254) 26 Aug. 1992 & JP-A-04 134 976 (Toshiba) 8 May 1992 *abstract*.
Vlajinic et al, "Universal DSP Board", Microprocessing and Microprogramming, vol. 25, No. 1-5, Jan. 1989.
Murakami et al, "A Proposed Universal Signal-processing System", SMPTE Journal, vol. 96, No. 6, Jun. 1987, pp. 527-531.
Pires et al, "Digital Broadcasting TV Decoding in the Presence of Errors: preliminary Simulation Study", Proceedings of the 1993 Picture Coding Symposium; Mar. 17-19, 1993, p. 17.3/b and FIG. 1.
Ulrich Schmidt et al: "Data-Driven Array Processor for video Signal Processing": IEEE 1990 International Conference on Consumer Electronics-FPM-21.3, pp. 326-327.

*Primary Examiner*—James J. Groody
*Assistant Examiner*—Sherrie Hsia
*Attorney, Agent, or Firm*—Cushman, Darby & Cushman

[57] ABSTRACT

An image signal processor for processing a received image signal. The received image signal can be at least one of an analog image signal and a digital image signal. The processor converts the analog image signal into first digital image data and converts the digital image signal to second digital image data. The processor selects at least one of the first and second digital image data as input image data. The input image data is then decode-processed based upon a selected at least one of a plurality of processing programs. The selected at least one processing program corresponds to the selected at least one of the first and second digital image data.

15 Claims, 29 Drawing Sheets

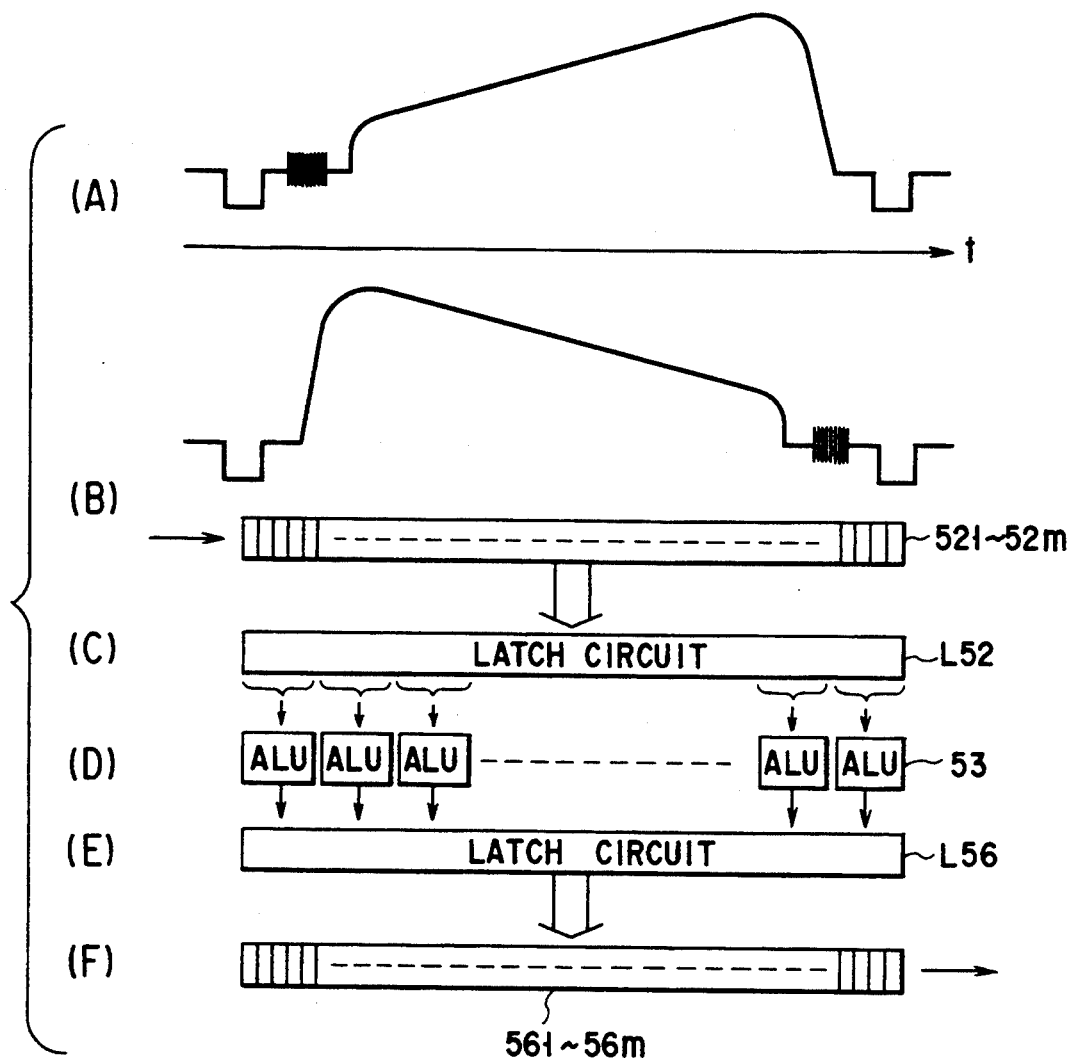
F I G. 3

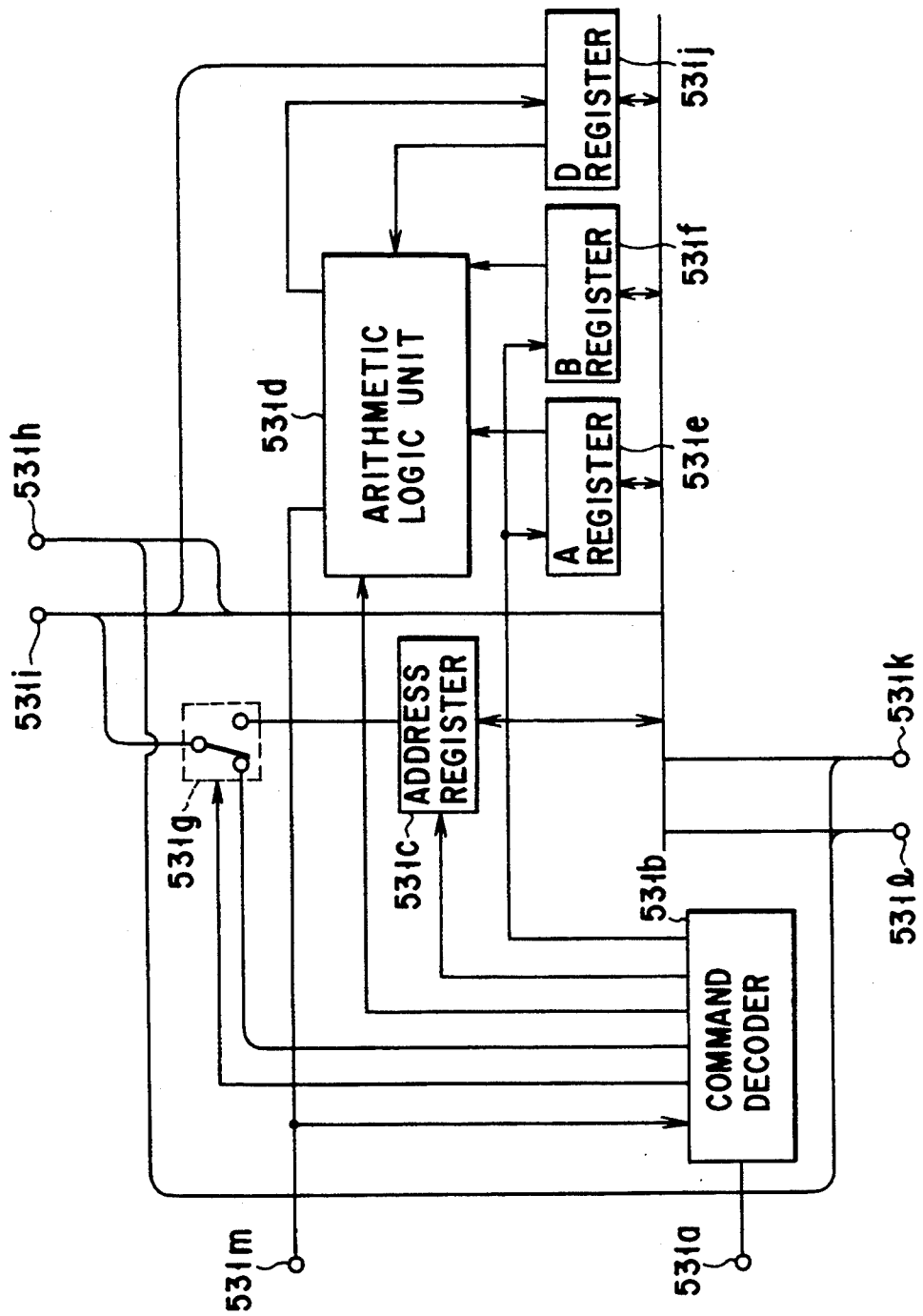
F I G. 4

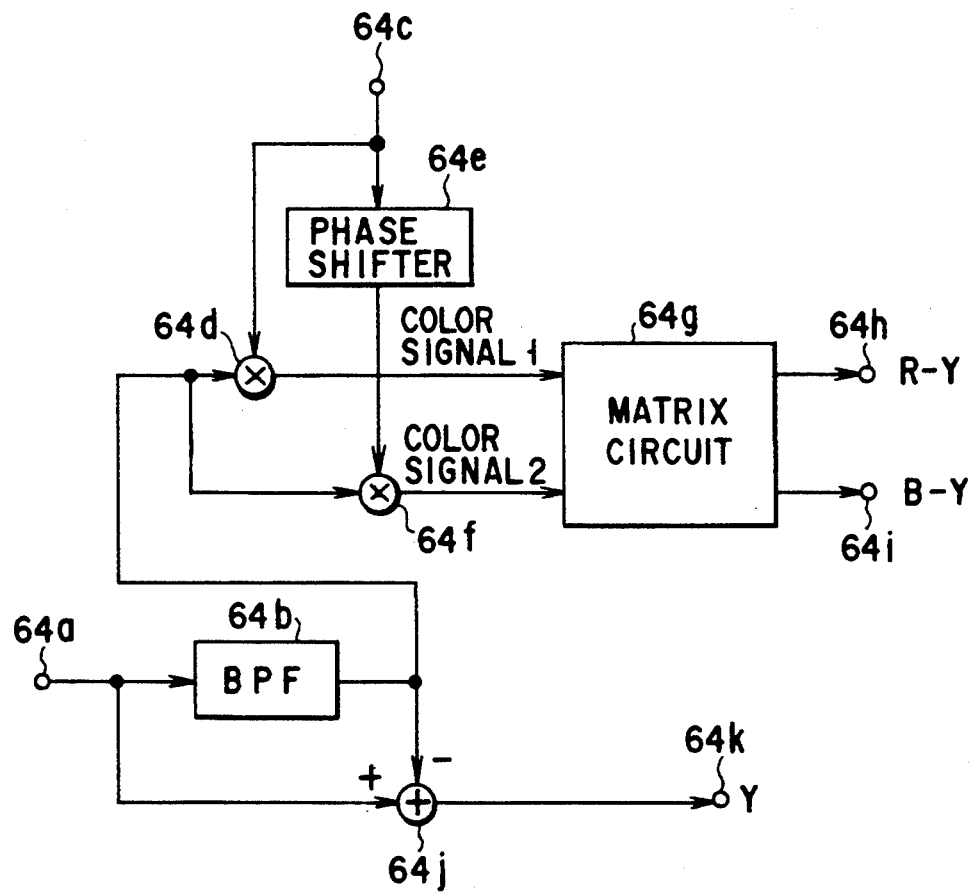
F I G. 9

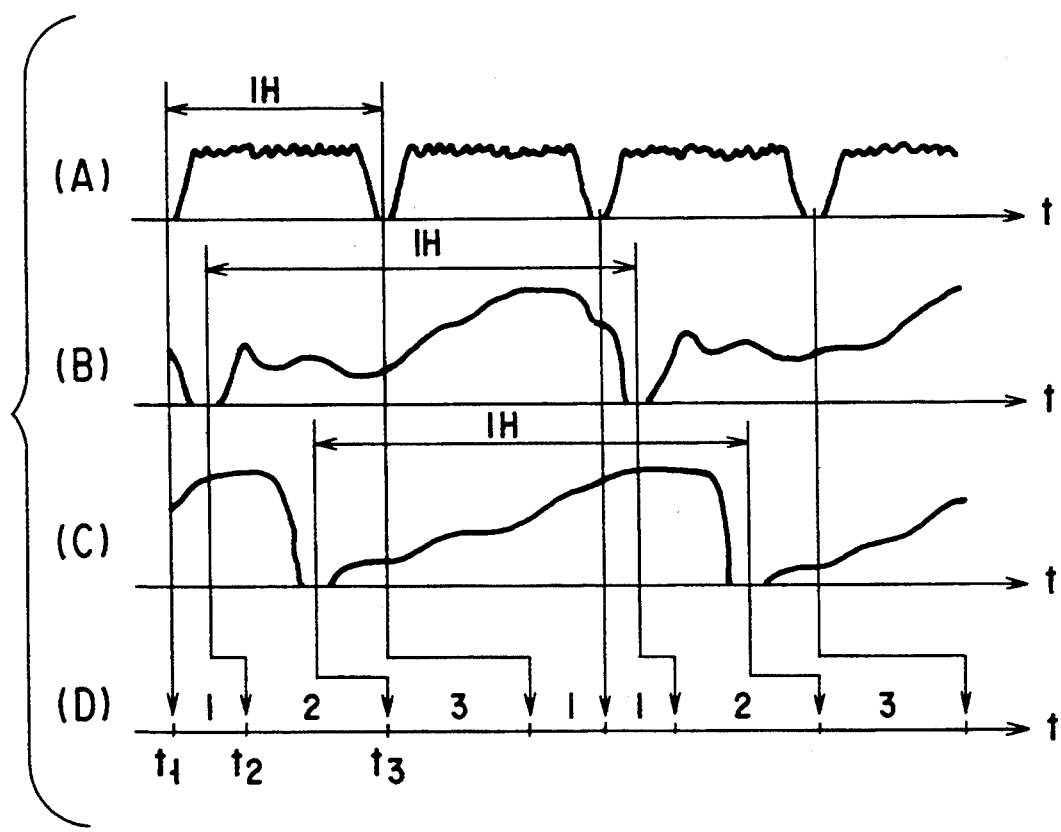
F I G. 15

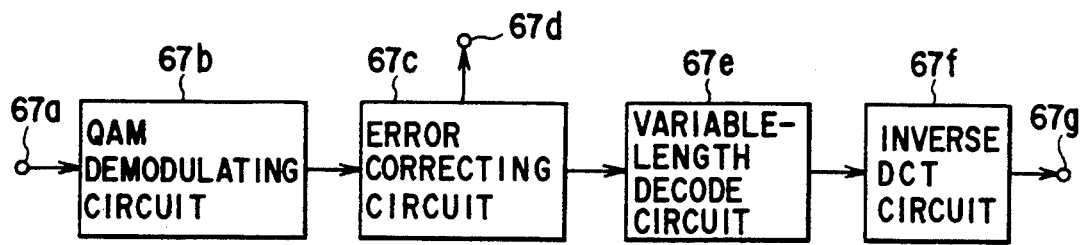
F I G. 19
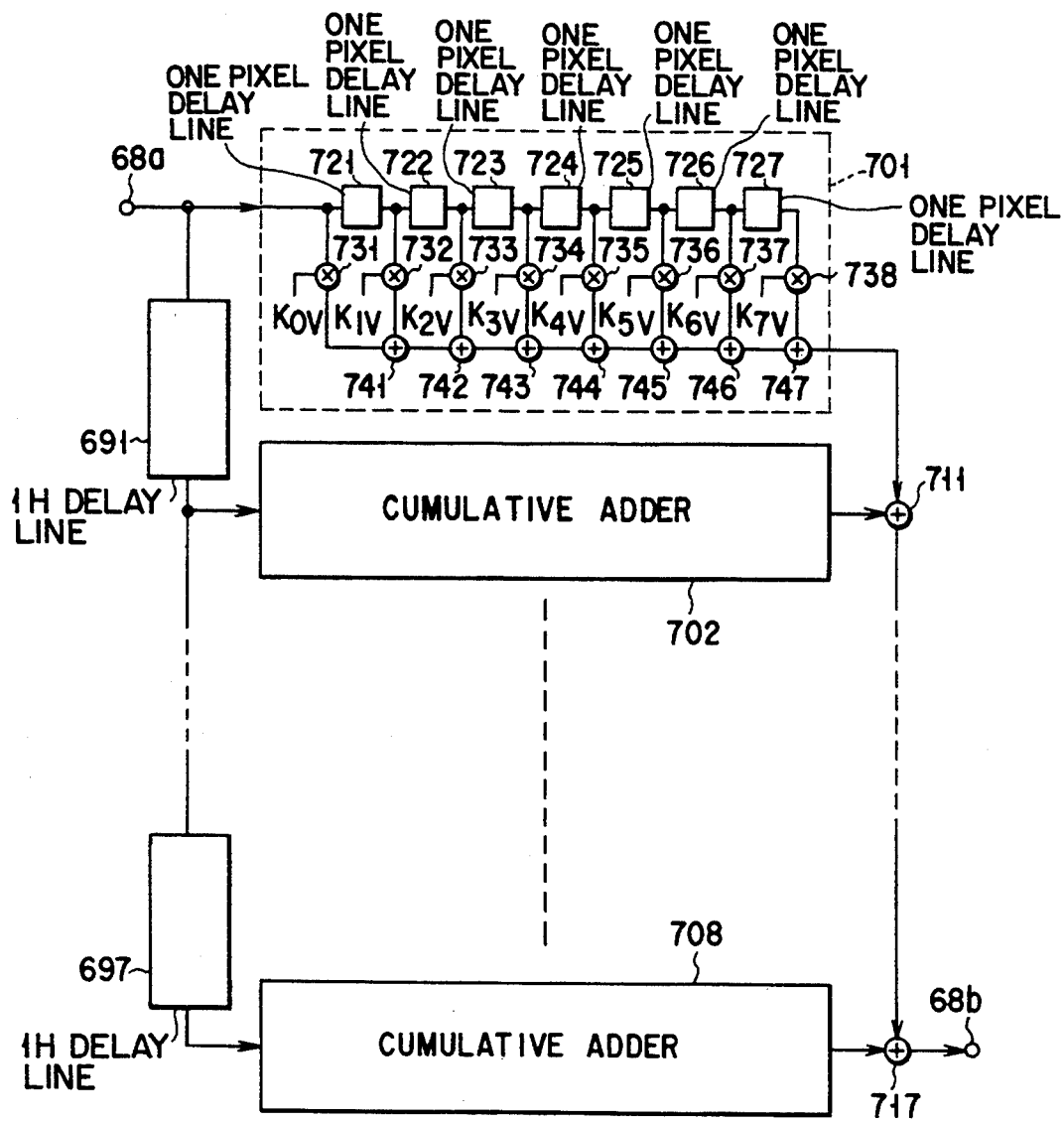
F I G. 20

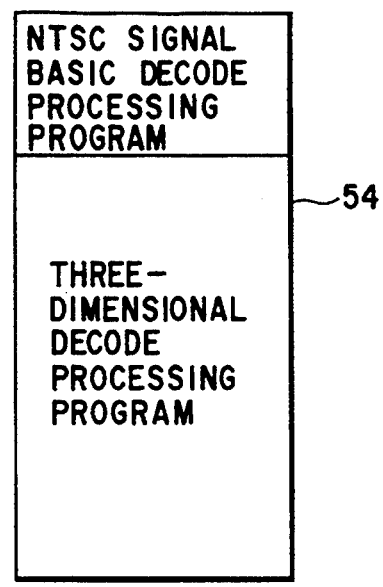
F I G. 23
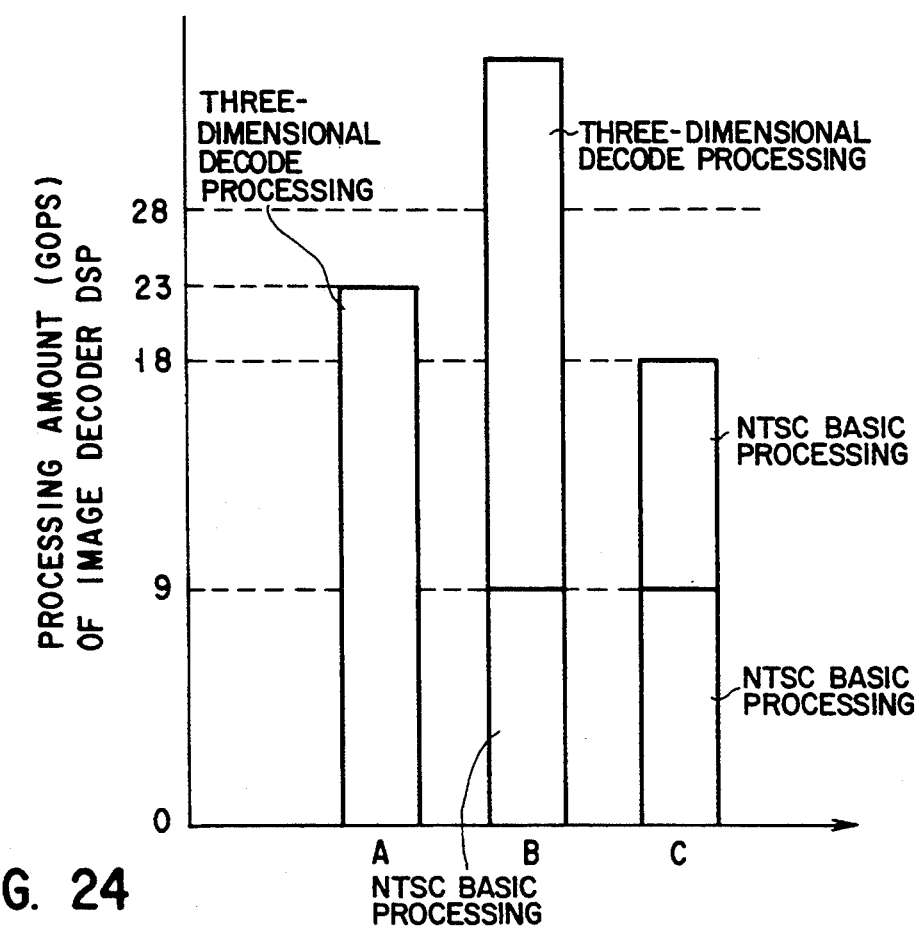
F I G. 24

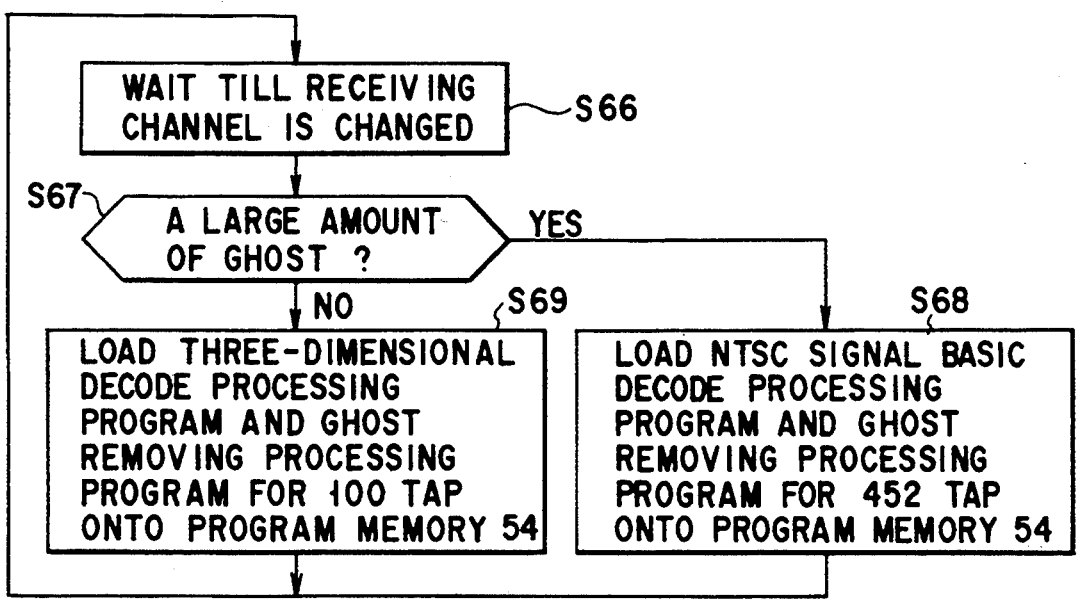
F I G. 31
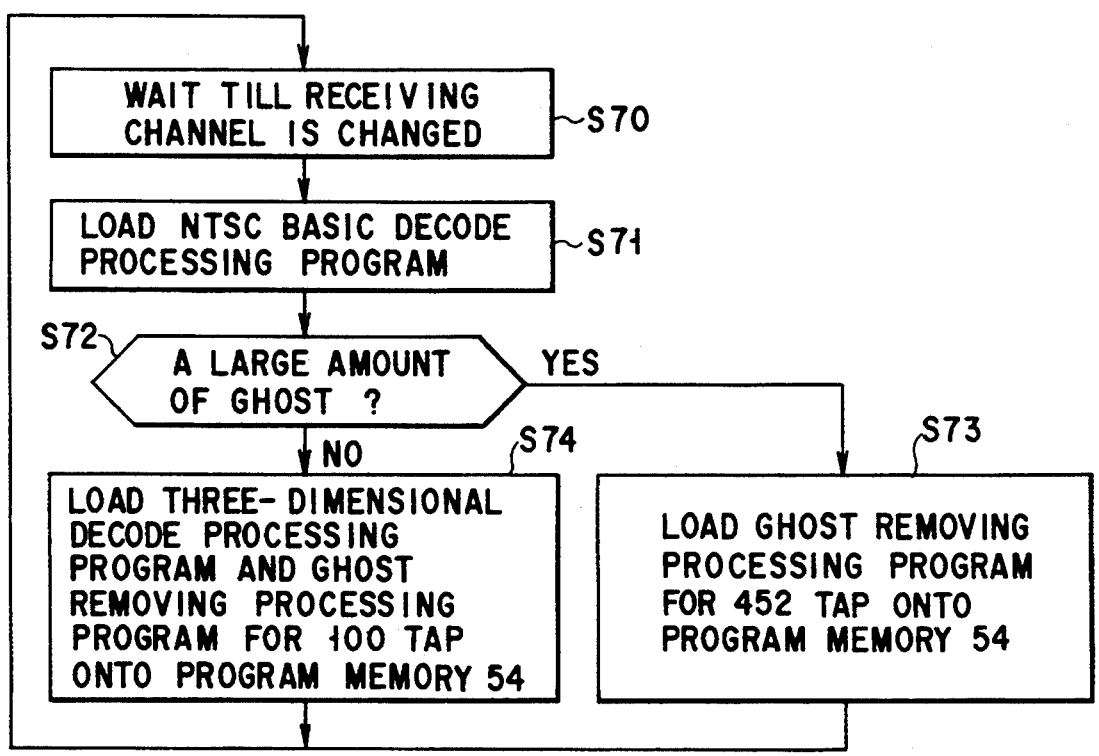
F I G. 32

| ADDRESS | ROM3201A | ROM3207A | ... | ROM3201B | ... | ROM3217H |
|---|---|---|---|---|---|---|
| 0 | k(0,0,0,0) | k(0,1,0,0) | | k(1,0,0,0) | | k(7,7,0,0) |
| 1 | k(0,0,1,0) | k(0,1,1,0) | | k(1,0,1,0) | | k(7,7,1,0) |
| 2 | k(0,0,2,0) | k(0,1,2,0) | | k(1,0,2,0) | | k(7,7,2,0) |
| ⋮ | ⋮ | ⋮ | | ⋮ | | ⋮ |
| 7 | k(0,0,7,0) | k(0,1,7,0) | | k(1,0,7,0) | | k(7,7,7,0) |
| 8 | k(0,0,0,1) | k(0,1,0,1) | | k(1,0,0,1) | | k(7,7,0,1) |
| 9 | k(0,0,1,1) | k(0,1,1,1) | | k(1,0,1,1) | | k(7,7,1,1) |
| 10 | k(0,0,2,1) | k(0,1,2,1) | | k(1,0,2,1) | | k(7,7,2,1) |
| ⋮ | ⋮ | ⋮ | | ⋮ | | ⋮ |
| 63 | k(0,0,7,7) | k(0,1,7,7) | | k(1,0,7,7) | ............ | k(7,7,7,7) |

$$k(u,v,i,j) = C(u) \cdot C(v) \cdot \cos((2i+1) \cdot u\pi/2N) \cos((2j+1) \cdot v\pi/2N)$$
$$N = 8$$
$$C(w) = 1/\sqrt{2} \quad \text{WHEN } w = 0$$
$$\phantom{C(w) =} 1 \quad \text{WHEN } w \neq 0$$

| ADDRESS | 3201A | 3207A | 3208A | 3209A | 3211A | 3213A | 3215A | 3217A |
|---|---|---|---|---|---|---|---|---|
| 64 | 0 | -0.25 | 0 | 0.5 | 0 | -0.25 | 0 | 0 |

| ADDRESS | 3201B | 3207B | 3208B | 3209B | 3211B | 3213B | 3215B | 3217B |
|---|---|---|---|---|---|---|---|---|
| 64 | 0 | 0.25 | 0 | -0.5 | 0 | 0.25 | 0 | 0 |

| ADDRESS | 3201C | 3207C |
|---|---|---|
| 64 | 1.0 | -1.0 |

| ADDRESS | 3201F | 3207F | 3208F | 3209F | 3211F | 3213F | 3215F | 3217F |
|---|---|---|---|---|---|---|---|---|
| 64 | 0.1 | -0.2 | -0.2 | 1.6 | -0.2 | -0.2 | 0.1 | 0 |

| ADDRESS | 3201G | 3207G |
|---|---|---|
| 64 | 0.9 | 0.1 |

| ADDRESS | 3201H | 3207H |
|---|---|---|
| 64 | 0.1 | 0.9 |

F I G. 40

IMAGE SIGNAL PROCESSING APPARATUS FOR PROCESSING MULTIPLEX IMAGE SIGNAL FORMATS

BACKGROUND OF THE INVENTION

1. Field of the Invention

The present invention relates to improvement of an image signal processor for reproducing and processing an image signal by use of a DSP (Digital Signal Processor).

2. Description of the Related Art

In recent years, the broadcast media has been diversified in accordance with the development of the digital technique. In particular, not only are television broadcast of an NTSC system capable of using a VHF band of a ground wave and an UHF band but are also capable of using, for example, a broadcast satellite (BS). A television broadcast having a high resolution (high-vision) of a MUSE system has also been realized.

In the future, in order to transmit the image signal, which uses the present ground wave and has a screen with an aspect ratio of 19:9, corresponding to the screen size, whose horizontal side is longer than the vertical side as compared with the present used screen size, and in order to transmit as many broadcasts as possible per one broadcast satellite and effectively use the satellite, the digital broadcast in which an image is digitized, and data-compressed so as to transmit the image signal in as small band as possible has been planned.

In accordance with the above-mentioned diversity of the broadcast media, there has been a requirement for a television receiver having a function which can receive the broadcast of the respective media and regenerate the image. In this case, there can be considered a function, which can simultaneously receive a plurality of broadcast media, and which can display the broadcasts on the same screen in a multi-screen form at the same time.

However, if a regenerating circuit for regenerating the image signal transmitted from the respective broadcast media is individually provided in order to develop the television receiver, which can handle such diversified broadcast media, the size of the apparatus is enlarged, the economical disadvantage increases, and therefore, is not suitable for practical application.

SUMMARY OF THE INVENTION

In consideration of the above problems, the present invention has been made, and an object of the present invention is to provide an image signal processor, which can provide a decode-processing to a plurality of types of image signals to be transmitted by a different television system with a simple structure, and which has economical advantage, and which can be suitably put into practice.

According to the above-mentioned structure, the inputted analog image signal is converted to the digital image signal, and the inputted digital image signal is converted to the digital image signal having a fixed amount of data for a fixed period and decoded-processed. The same decode-processing circuit can be used for both decode-processing of the image signal transmitted in a digital manner and decode-processing of the image signal is transmitted in an analog manner. Therefore, a regenerating processing can be provided to a plurality of types of image signals to be transmitted by a different television system with a simple structure, and the present invention has economical advantage, and can be suitably put into practice.

BRIEF DESCRIPTION OF THE DRAWINGS

FIGS. 3(A) to 3(F) are views for explains the outline of the operation of the image decoder DSP, respectively;

FIG. 4 is a block diagram for explaining the details of an ALU used in the image decoder DSP;

FIG. 9 is a block diagram for explaining decode processing means of an NTSC system image signal by use of the ALUs by a functional expression;

FIG. 15 explains a decode processing operation of a plurality of image signals in the image decoder DSP, respectively;

FIG. 19 is a view for explaining a decode system for receiving the digital broadcast, respectively;

FIG. 20 is a block diagram for explaining an inverse DCT calculation processing means of the digital broadcast by use of the ALU by a functional expression;

FIG. 23 is a view for explaining a state that a basic decode processing program and a three-dimensional decode processing program are written in the program memory;

FIG. 24 is a view for explaining the relationship between a decode processing ability of the image decoder DSP and the decode processing program;

FIG. 31 is a flow chart for explaining a switching operation of the program to be sent to the image decoder DSP in the modification;

FIG. 32 is a flow chart for explaining the other switching operation of the program to be sent to the image decoder DSP in the modification;

FIG. 40 is a view for explaining an operation of the decode processing of the NTSC system image signal in the image decoder circuit of FIG. 33.

DETAILED DESCRIPTION OF THE PREFERRED EMBODIMENT

An embodiment of the present invention will be explained with reference to the drawings.

Figure 1:
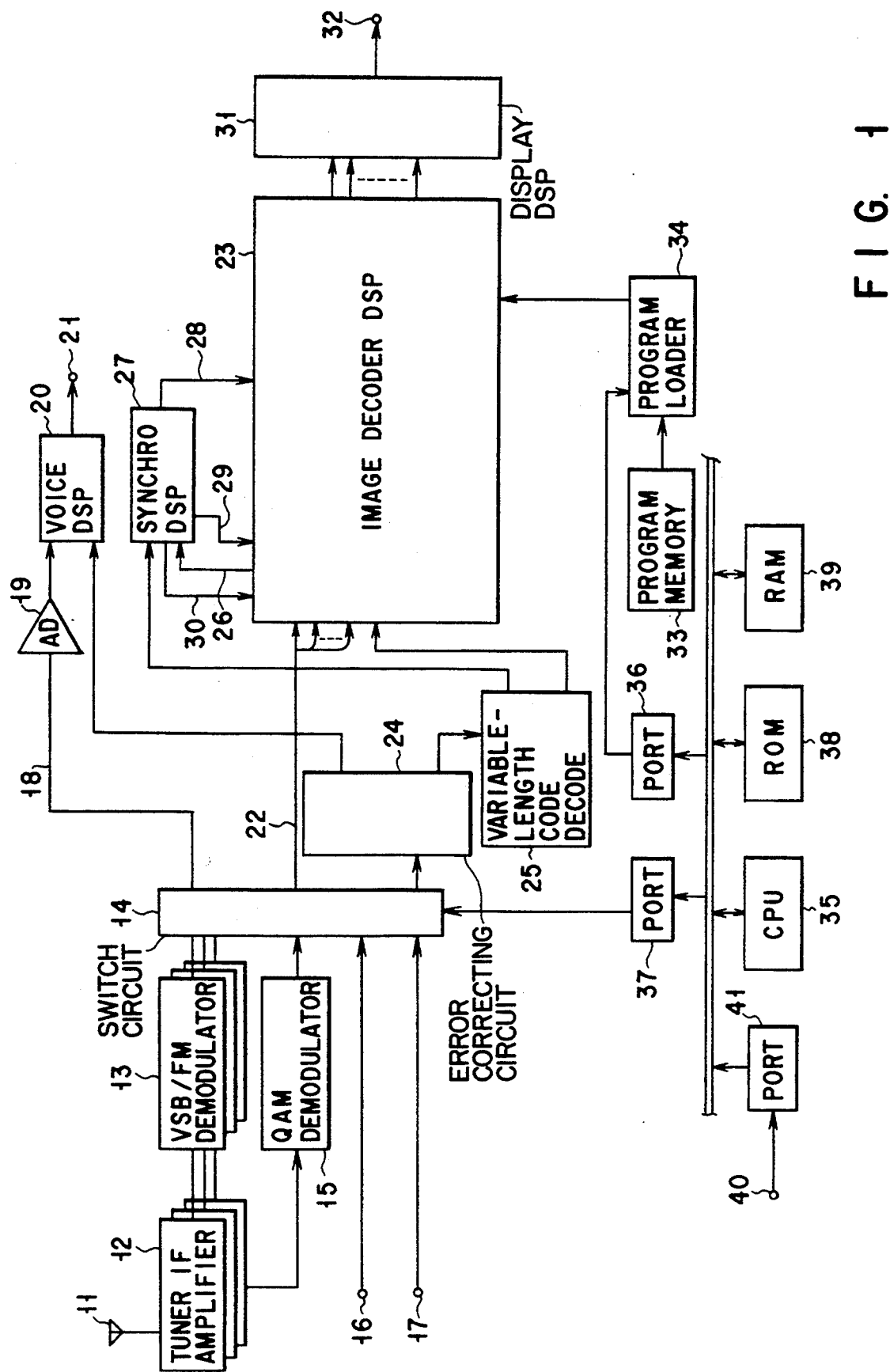
FIG. 1 is a block diagram for explaining one embodiment of an image signal processor according to the present invention.

In FIG. 1, reference number 11 is an antenna. In a case where the antenna 11 receives a television broadcasting radio wave of NTSC system using a VHF band of a ground wave and a UHF band, an image signal obtained from the antenna 11 is passed through a tuner IF (intermediate frequency) amplifier 12 and sent to a VSB/FM demodulator 13 to be demodulated to an analog base band signal, and outputted to a switch circuit 14. The tuner IF amplifier 12 and VSB/FM demodulator 13 are provided in the same system and therefore a plurality of television broadcasts in the same frequency band or different frequency band can be simultaneously received and demodulated in the same NTSC system.

On the other hand, in a case where the antenna 11 receives a digital broadcasting radio wave in which an image signal is digitized and transmitted, the image signal obtained from the antenna 11 is passed through the tuner IF amplifier 12, sent to a QAM demodulator 15 (amplitude modulation using two orthogonal carriers), and demodulated, thereby the signal is converted to a bit string having binary data (digital image data), and outputted to the switch circuit 14.

An analog base band signal and digital image data are respectively inputted to the switch circuit 14 from an outer unit through input terminals 16 and 17. The switch circuit 14 outputs a signal, which is selected from the above four types of input signals by an operator.

The switch circuit 14 outputs an analog voice signal of the inputted analog base band signals on an output line 18. The analog voice signal outputted to the output line 18 is sent to an A/D (analog/digital) converter 19, and converted to digital voice data. The digital voice data outputted from the A/D converter 19 is sent to a voice DSP 20, and a predetermined data processing is provided thereto. The output on output terminal 21 can then be voice-regenerated.

The switch circuit 14 outputs an analog base band image signal of the inputted analog base band signal on output line 22. The analog base band image signal outputted to the output line 22 is then inputted to an image decoder DSP 23. As explained above, the output line 22 is formed to correspond to the number of television broadcasters, which are simultaneously received. The image decoder DSP 23, which is detailed later, performs the function of decode-processing the plurality of the inputted analog base band image signals.

Digital image data which is outputted from the switch circuit 14 is sent to an error correcting circuit 24. Error correction processing and separation processing which separates data into a voice component and an image component are performed are performed by error correcting circuit 24. The separated digital voice component is sent to the voice DSP 20, and a predetermined data processing is provided thereto. The output from the output terminal 21 can then be voice-regenerated. The separated digital image component is supplied to a variable-length code decode circuit 25 and is thereby converted and decoded such that data rate of bit stream has a fixed amount of data within a fixed period of time. Thereafter, the digital image component is supplied to the image decoder 23, and is thereby decode-processed.

The image decoder DSP 23 digitizes the inputted analog base band image signal. The digitized image signal is supplied to a synchro DSP 27 through an output line 26. The synchro DSP 27 extracts a synchronous signal portion from the image signal, and generates a horizontal synchronous signal of the image signal and a sample clock signal, which is synchronous with the horizontal synchronous signal, from its phase data. The generated horizontal synchronous signal and sample clock signal are outputted to the image decoder DSP 23 through an output line 28. In the case of the transmission system using a color subcarrier such as a vertical synchronous signal and NTSC, the synchro DSP 27 regenerates a color subcarrier signal, and outputs the signal to the image decoder DSP 23 through an output line 29.

In order to digitally convert the analog base band image signal at a suitable level by the image decoder DSP 23, the synchro DSP 27 generates a clamp control signal, and outputs the signal to the image decoder DSP 23 though an output line 30.

For example, in the case of the image signal of the NTSC system, the image decoder DSP 23 performs the separation between a luminance signal and a color signal, demodulation of the color signal, and adjustment of a color thickness and color tune, thereby restoring three primary colors. In the case of the other transmission systems, the signal processing is performed in accordance with each transmission system, so that the three primary colors are restored. The switching of the contents of the signal processing can be realized by changing the content of the program which the image decoder DSP 23 performs, the details of which are explained later.

The image signal decoded by the image decoder DSP 23 is supplied to a display DSP 31 which performs a frame synchronizing process, an image scaling process and a superimposing process. The image signals are then assembled in one screen. Then, the image signals are retrieved from the output terminal 32. The image signals retrieved from the output terminal 32 are image-displayed on, for example, a CRT (Cathode Ray Tube) or a liquid crystal display.

The various types of programs to be supplied to the image decoder DSP 23 are restored in a program memory 33. A predetermined program is read from the program memory 33 by a program loader 34, and is then supplied to the image decoder DSP 23. The program loader 34 is controlled by a CPU (Central Processing Unit) 35 through a port 36. The CPU 35 controls the switching circuit 14 through a port 37.

The CPU 35 performs the calculation processing by use of RAM (Random Access Memory) 39 based upon the program stored in a ROM (Read Only Memory) 38, and controls the operation of the entire image signal processing system. Operation data, which is sent by an operator, is supplied to the CPU 35 by an input terminal 40 through a port 41. The CPU 35 controls the program loader 34 and the switch circuit 14 based upon the inputted operation data.

Figure 2:
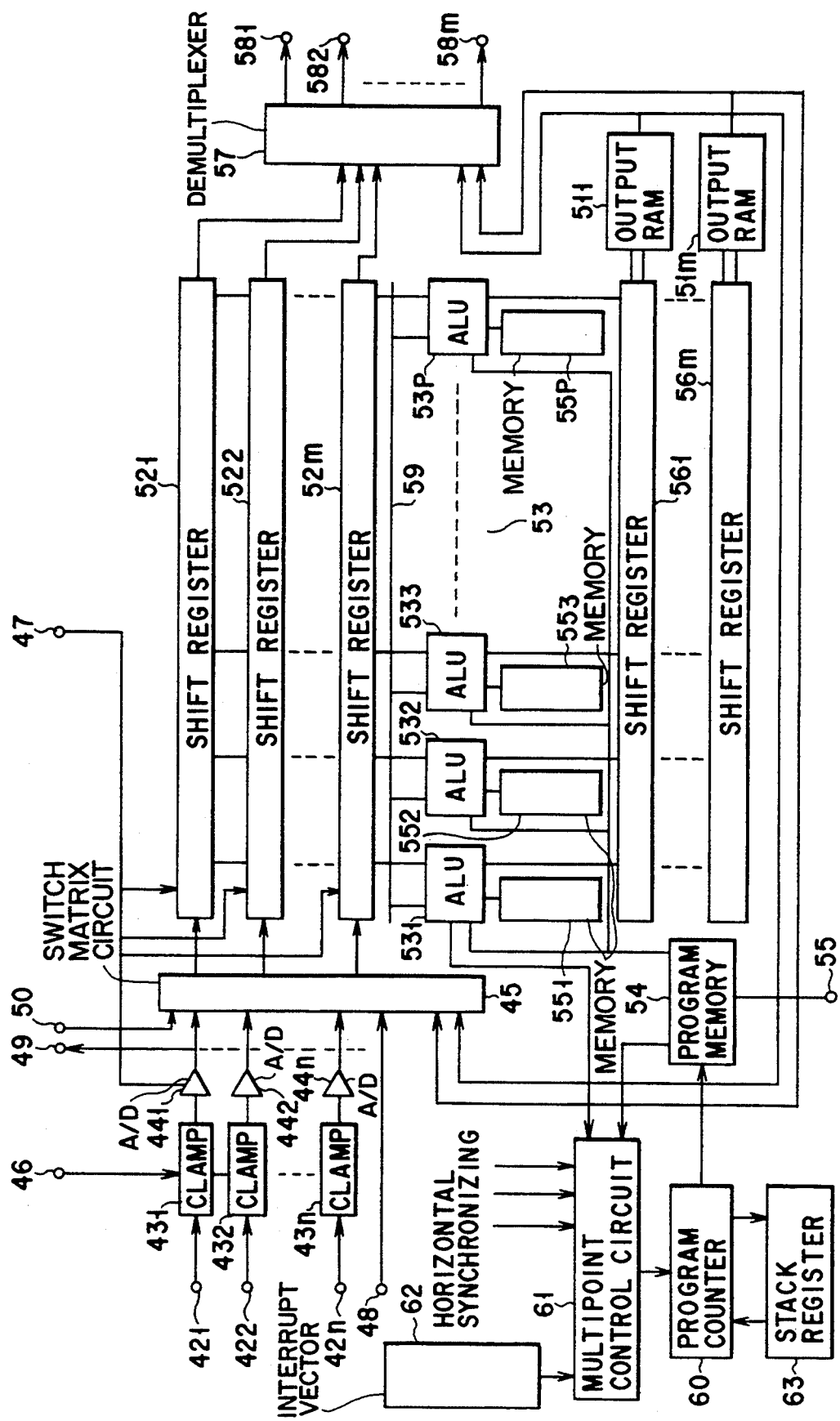
FIG. 2 is a block diagram for explaining the details of an image decoder DSP used in this embodiment.

FIG. 2 shows an internal structure of the image decoder DSP 23. More specifically, reference numerals 421, 422, . . . , 42n are input terminals. A plurality of analog base band image signals, which are introduced upon the output line 22, are supplied to the respective input terminals 421, 422, . . . , 42n. Each analog base band image signal, which is supplied to the respective input terminals 421, 422, . . . , 42n, is supplied to the respective claim circuits 431, 432, . . . , 43n, and is thereby level-controlled. Thereafter, each analog base band image signal is supplied to a corresponding A/D converter 441, 442, . . . , 44n so as to be digitized, and supplied to a switch matrix circuit 45.

The clamp circuits 431, 432, . . . , 43n control the level of the analog base band image signals, which are inputted through an input terminal 46 and is based upon a clamp control signal outputted from the synchro DSP 27, so as to be within a dynamic range of A/D converters 441, 442, . . . , 44n. The A/D converters 441, 442, . . . , 44n executes the A/D conversion processing of the analog base band image signal based on the sample clock signal, which is supplied through an input terminal 47 and is outputted from the synchro DSP 27.

Digital image data, which is decoded by the variable-length code decode circuit 25, is supplied to the switch matrix circuit 45 through an input terminal 48. Digital image data, which is outputted from the A/D converters 441, 442, . . . , 44n, and digital image data, which is supplied to the input terminal 48, are sent to the synchro DSP 27 through an output terminal 49, so as to generate the horizontal synchronous signal, the vertical synchronous signal, the clamp control signal, the color sub-carrier signal, and the sample clock signal. The horizontal synchronous signal and the color sub-carrier signal, which are generated by the synchronous DSP 27, are supplied to the switch matrix circuit 45 through an input terminal 50.

Digital image data, which is outputted from output RAMs 511, . . . , 51m, which is detailed later, is supplied to the switch matrix circuit 45. The switch matrix circuit 45 selects m data from the vertical synchronous signal and the color sub-carrier signal, which are both supplied through the input terminal 50, digital image data, which is outputted from the A/D converters 441, 442, . . . , 44n, digital image data, which is supplied to the input terminal 48, and digital image data, which is outputted from output RAMs 511, . . . , 51m, and supplies selected m data to shift registers 521, 522, . . . , 52m, respectively.

The shift registers 521, 522, . . . , 52m can shift-input data for 1H period of time (horizontal scanning) based on the sample clock signal and the horizontal synchronous signal, which respectively are supplied through the input terminal 47 and outputted from the synchronous DPS 27. In other words, if digital image data, which corresponds to the waveform for 1 H period of time as shown in FIG. 3(A), is outputted from the switch matrix circuit 45, corresponding digital image data in the direction of the waveform as shown in FIG. 3(B), is sequentially shifted from the left side to the right side, and inputted to the shift registers 521, 522, . . . , 52m.

A latch circuit L52 as shown in FIG. 3(C) is built into each of the shift registers 521, 522, . . . , 52m. If digital image data for 1 H period of time is stored in the shift registers 521, 522, . . . , 52m, the stored digital image data is transferred to the latch circuit L52 by the timing, which is based on the horizontal synchronous signal. As shown in FIGS. 2 and 3(D), digital image data for 1 H period of time, which is stored in the latch circuit L52 of the respective shift registers 521, 522, . . . , 52m, is time-divisionally supplied to a calculation unit 53, which comprises a plurality of ALUs (Arithmetic Logic Unit) and performs the calculation for decoding digital image data.

The calculation unit 53 time-divisionally retrieves digital image data for 1 H period of time, which is stored in the latch circuit L52 of the respective shift registers 521, 522, . . . , 52m, shares the retrieved digital image data for 1 H period of time by the plurality of ALUs and executes the signal processing within 1 H period of time. If only one pixel is calculated by one ALU, which is needed in the case of the NTSC system, that the total number of ALUs is 910, which is the number of pixels in the horizontal direction. If the calculation of the plurality of pixel data can be performed by one ALU, the number of ALUs can be reduced accordingly.

As shown in FIG. 2, the respective ALUs 531, 532, 533, . . . , 53p of the calculation unit 53 execute the calculation processing based on the program stored in the program memory 54. In the program memory 54, a program is selectively read from various types of programs stored in the program memory 33 by the program loader 34, and loaded through the input terminal. In order to decode-process m digital image data stored in the latch circuit L52 of the respective shift registers 521, 522, . . . , 52m, up to m programs can be loaded to the program memory 54. These programs are time-divisionally supplied to the respective ALUs 531, 532, 533, . . . , 53p, so that each digital image data is sequentially decode-processed in a time divisional manner.

Memories 551, 552, 553, . . . , 55p are connected to ALUs 531, 532, 533, . . . , 53p, respectively. The calculation result of each of ALUs 531, 532, 533, . . . , 53p is stored by the respective memories 551, 552, 553, . . . , 55p.

Output data of the calculation unit 53 is selectively supplied to m shift registers 561, . . . , 56m. For example, data which is digital image data latched by the shift register 521 is decode-processed by the calculation unit 53 and is supplied to a shift register 561. Then, data which is digital image data latched by the shift register 522 is decode-processed by the calculation unit 53 and is supplied to a shift register 562.

As shown in FIG. 3(E), a latch circuit L56 is provided in the shift registers 561, . . . , 56m. If output data is supplied from the calculation unit 53, data is latched by the latch circuit 56, and is then transferred to the shift registers 561, . . . , 56m by the timing, which is based on the horizontal synchronous signal, as shown in FIG. 3(F). Data transferred to the shift registers 561, . . . , 56m is serially outputted to the output RAMs 511, . . . , 51m based on the sample clock signal supplied through the input terminal 47.

Each of the shift registers 561, . . . , 56m are formed of a shift register for image data and a shift register for address. An address is outputted from the shift register for address, and data outputted from the shift register for image data is sequentially written in the address of RAMs for output 511, . . . , 51m. The address, which sequentially changes continuously from 1, is supplied to the RAMs for output 511, . . . , 51m, so that data is read data. Read data is added to a demultiplexer 57 and data is selected and retrieved from output terms 581, 582, . . . , 58m. In the case of the multiplexed signal such as the color signal, the multiplexed signal is demultiplexed as required, and outputted to the output terminals 581, 582, . . . , 58n.

The address for the reading of data to be supplied to the RAMs 511, . . . , 51m is given by not only the value, which simply increase from 1 by the programming, but by also an arbitrary permutation. For example, by use of ROM and RAM, the address value is converted to the output of the counter, which simply increases from 1. Thereby, the time axis length in the horizontal direction of the image can be easily made. The data communication between ALUs 531, 532, 533, . . . , 53p can be made through a communication bus 59.

The reading address, to be supplied to the program memory 54, is generated from a program counter 60. The program switching for reading the address from the program memory 54 and supplying the address to the calculation unit 53 can be realized by noting that a multipoint control circuit 61 operates the program counter 60 based upon an output of an interrupt vector generating circuit 62 and a horizontal synchronous signal. In order to temporarily hold an address outputted from the program counter 60, a stack register 63 is provided.

FIG. 4 shows an internal structure of ALU 531. Since the structure of the other ALUs 532, 533, . . . , 53p is the same as that of ALU 531, the explanation is omitted. Reference numeral 531a is an input terminal. Program data read from the program memory 54 is supplied to the input terminal 531a. Program data supplied to the input terminal 531a is inputted to a command decoder 531b, whereby program data is decoded. The command decoder 531b controls an address register 531c, and arithmetic logic unit 531d, and A register 531e, a B register 531f, and a switch 531g based upon the decoding result, so that a desired calculation processing (i.e., a decode processing) is executed.

Digital image data, which is held in the latch circuit L52, is inputted to an input terminal 531h. An input terminal 531i is connected to the communication bus 59. The calculation result of the arithmetic logic unit 531d is supplied to a D register 531j. Thereafter, the calculation result is outputted to shift registers 561, . . . , 56m through an output terminal 531k, and outputted to the memory 551 through an output terminal 531l. The arithmetic logic unit 531d outputs a signal, which indicates the calculation being performed, to the multipoint control circuit 61 through an output terminal 531m.

Figure 5:
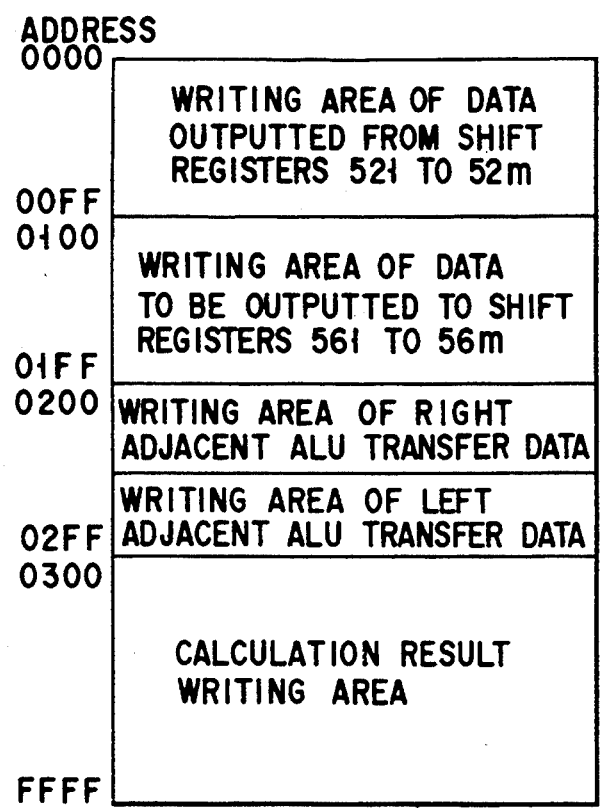
FIG. 5 is a view for explaining a data writing region of various data in a memory added to the ALU.

As shown in FIG. 5, in the memory 551, address from 0000 hexadecimal) to 00FF (hexadecimal) is an area where data outputted from the shift registers 521, 522, . . . , 52m is written, address from 0100 (hexadecimal) to 01FF (hexadecimal) is an area where data outputted to shift registers 561, . . . , 56m is written, address from 0200 (hexadecimal) to 02FF (hexadecimal) is an area where right and left adjacent ALU transfer data is written, and address from 0300 (hexadecimal) to FFFF (hexadecimal) is an area where the calculation result is written.

The following will explain that various types of calculation processing or signal processing that can be performed by switching the program to be given to the above-structured ALU 531.

Figure 6:
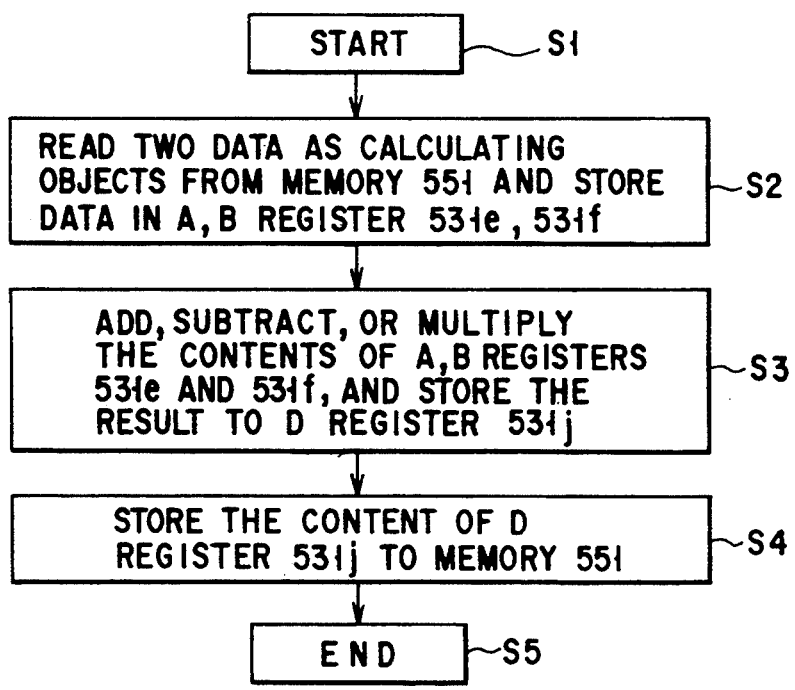
FIG. 6 is a flow chart for explaining the operations of the addition processing, subtraction processing and multiplication processing by use of the ALU.

FIG. 6 is a flow chart for explaining the operations of the addition processing, subtraction processing and multiplication processing. If the processing is started (step S1), the command decoder 531b reads two data as calculating objects from the writing area of the data outputted from the shift registers 521, 522, . . . , 52m of the memory 551, and is stored in A and B registers 531e and 531f in step S2. In step S3, the command decoder 531b controls the arithmetic logic unit 531d so as to perform the adding process of data stored in the A and B registers 531e and 531f, the subtracting process, or the multiplying process, and stores the calculation result to the D register 531j. In step S4, the command decoder 531d writes data stored in the D register 531j to the writing area of the calculation result of the memory 551, and the calculation processing is ended (step S5).

Figure 7:
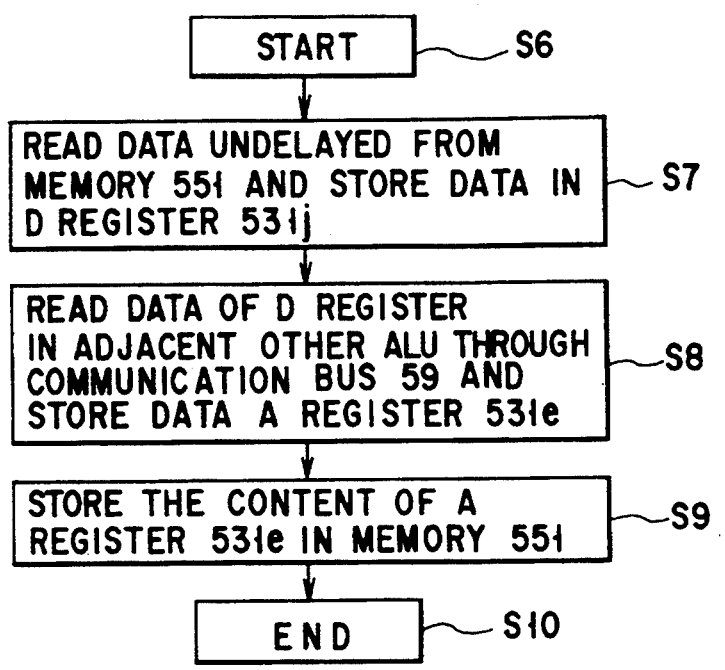
FIG. 7 is a flow chart for explaining the operation of one pixel delay processing by use of the ALU.

FIG. 7 is a flow chart for explaining the operation of one pixel delay processing. If the processing is started (step S6), the command decoder 531b reads undelayed data from the memory 551, and stores data to the D register 531j in step S7. In step S8, the command decoder 531b reads data stored in the D register of the adjacent ALU through the communication bus 59, and stores data in the A register 531e. In step S9, the command decoder 531 writes data stored in the A register 531e to the memory 551, and one pixel delay processing is ended (step S10).

Figure 8:
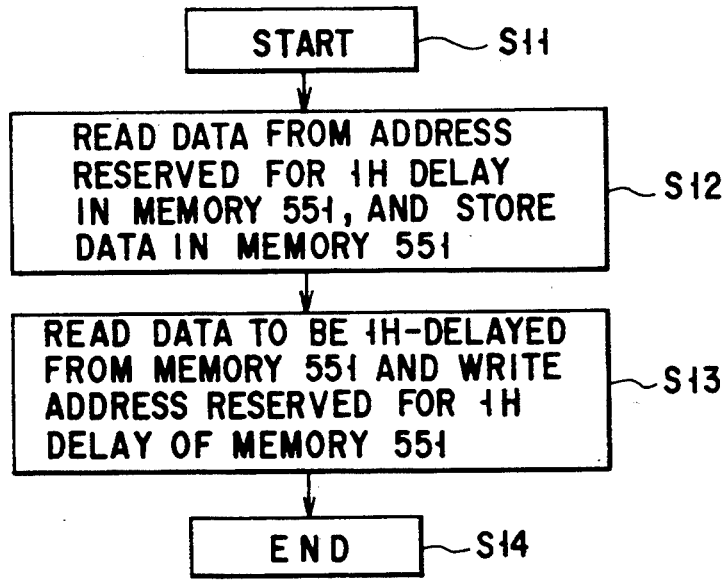
FIG. 8 is a flow chart for explaining the operation of 1 H delay processing.

FIG. 8 is a flow chart for explaining the operation of 1 H delay processing. If the processing is started (step S11), the command decoder 531b reads data from the address reserved for 1 H delay in the memory 551, and stores it in the memory 551 in step S12. In step 513, the command decoder 531b reads data to be 1 H-delayed from the memory 551, and writes data in the address reserved for 1 H delay of the memory 551, and the 1 H delay processing is ended (step S14).

In consideration of the fact that various types of calculation processing or signal processing can be performed by switching the program to be given to the above-structured ALUs 531 to 53p.

The following will explain that the decode processing of the image signal in the NTSC system is performed by ALUs 531 to 53p. FIG. 9 is a block diagram for explaining processing means for decoding the image signal encode-processed based upon the NTSC system by use of ALUs 531 to 53p in a functional expression.

Figure 10:
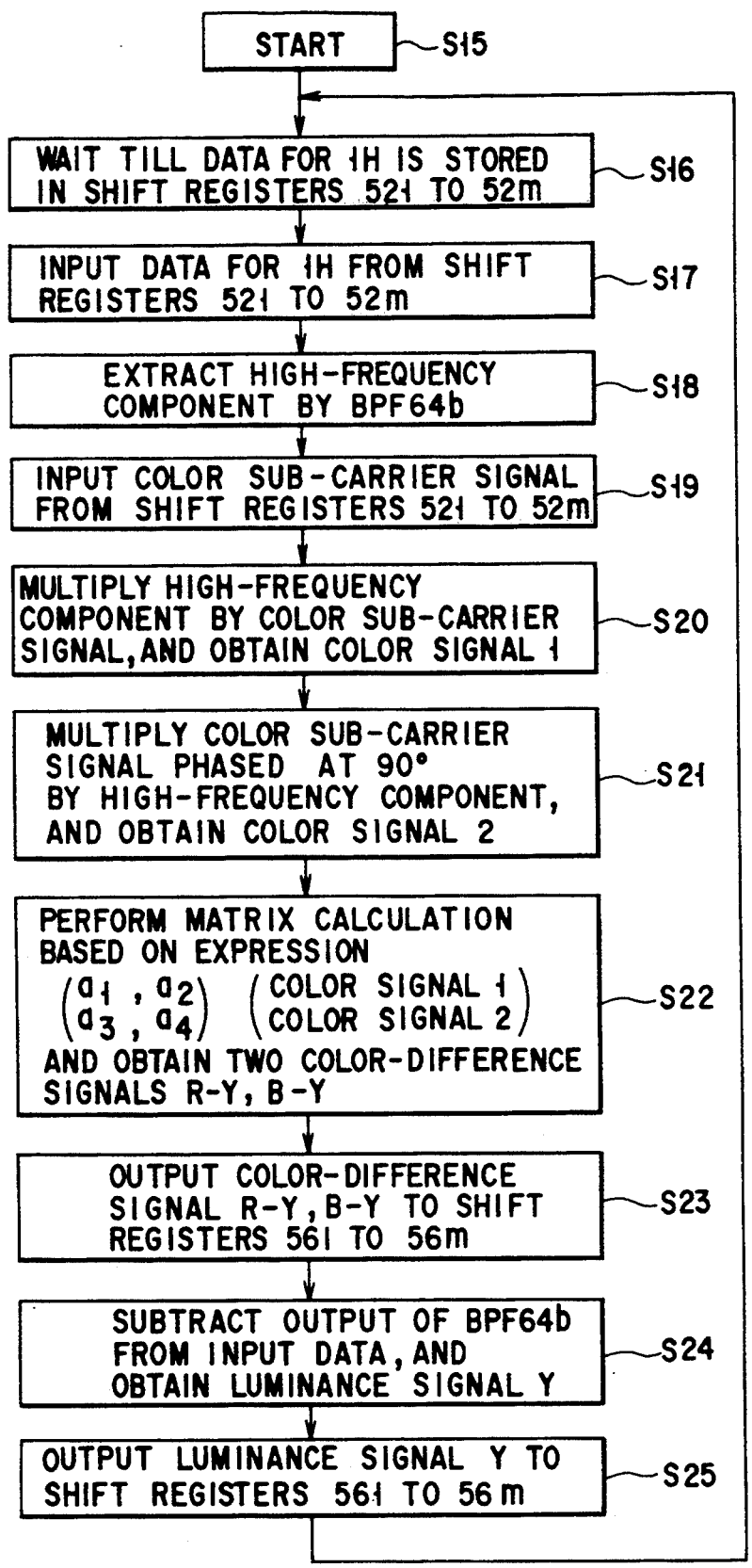
FIG. 10 is a flow chart for explaining the operation of decode processing by use of the decode processing means.

This will be explained with reference to the flow chart of FIG. 10.

If the processing is started (step S15), ALUs 531 to 53p wait until digital image data for 1 H is stored in the shift registers 521, 522, ..., 52m in step S16. In step S17, ALUs 531 to 53p retrieve digital image data for 1 H stored in the shift registers 521, 522, ..., 52m through an input terminal 64a. In step S18, ALUs 531 to 53p pass retrieved digital image data through a BPF (band pass filter) 64b and extract a high-frequency component. In step S19, ALUs 531 to 53p retrieve a color sub-carrier signal stored in the shift registers 521, 522, ..., 52m through an input terminal 64c. In step S20, ALUs 531 to 53p multiply the high-frequency component, which is outputted from the BPF 64b, and the color subcarrier signal by use of a multiplying circuit 64d, and obtain a color signal 1. In step S21, ALUs 531 to 53p multiply a signal, which is obtained by changing the phase of the color sub-carrier signal to 90°, and the high-frequency component, which is outputted form the BPF 64b, by use of a multiplying circuit 64f, and thereby obtaining a color signal 2.

In step S22, ALUs 531 to 53p perform a matrix calculation relating to two color signals 1 and 2 by use of a matrix circuit 64g, and generate two color-difference signals R-Y and B-Y. In step S23, ALUs 531 to 53p output two color-difference signals R-Y and B-Y to the shift registers 56l, ..., 56m through output terminals 64h and 64i. In step S24, ALUs 531 to 53p subtract the output of BPf 64b from digital image data supplied to the input terminal 64a by use of a subtracting circuit 64j, and generates a luminance signal Y. In step S25, ALUs 531 to 53p output the luminance signal Y to the shift registers 561, ..., 56m through an output terminal 64k and the processing is returned to step S16, and the decode-processing of the image signal in the NTSC system is performed.

In recent years, a signal processing, e.g., a nonlinear calculation processing and an image delay processing in the television receiver has been extremely complicated so as to improve the quality of the received image. In order to realize the complicated signal processing, the image decoder DSP 23 has a conditional branch processing function, and a control function other than the function of executing the arithmetic operation and the pixel movement calculation processing.

More specifically, regarding the conditional branch processing function, the calculation result of ALUs 531 to 53p is supplied to the multipoint control circuit 61 through an output terminal 531m (FIG. 4), so that the program is changed on the condition of what calculation result is obtained. The control function controls whether or not the ALUs 531 to 53p execute the processing on the condition of what calculation result is obtained.

Figure 11:
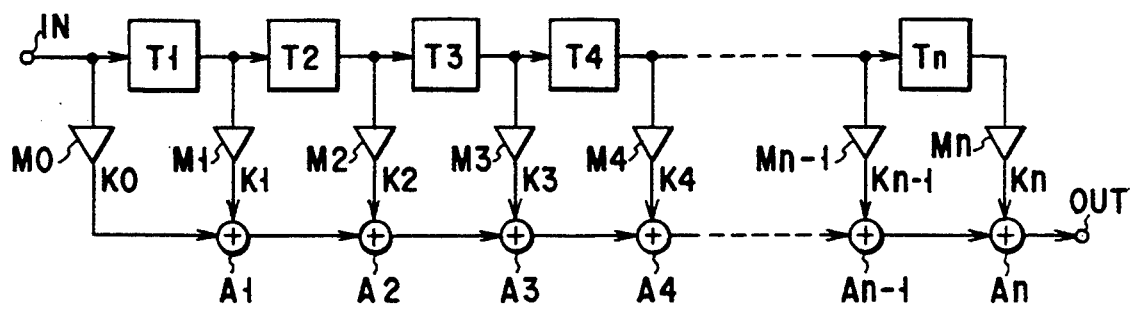
FIG. 11 is a block diagram for explaining ghost removing means by use of the ALU by a functional expression.

Regarding the standard of a clear-vision, a ghost reference signal waveform signal (GCR signal) is multiplexed for a period of a vertical retrace line of the image signal, and ghost is removed with reference to the GCR signal at the receiving side. FIG. 11 is a block diagram for explaining processing means which is used in the case that ghost removal is performed with reference to the GCR signal by use the ALUs 531 to 53p by a functional expression. In view of the circuit, a transversal filter is structured.

A digital image data supplied to the input terminal IN is delayed by a plurality of delay lines with a tap T1, T2, T3, T4, ..., Tn, which are connected in series. The multiplication of the tap outputs of the delay lines T1 to Tn and tap coefficients k0, k1, k2, k3, k4, ..., kn−1, kn is performed by coefficient units M0, M1, M2, M3, M4, ..., Mn−1, respectively. The outputs of the coefficient units M0 to Mn are cumulatively added by adders A1, A2, A3, A4, ..., An−1, An, thereby digital image data in which a distortion component due to ghost is removed can be received from the output terminal OUT.

Therefore, at the time when the image signal of NTSC system is received, a program for performing the decode-processing function of the image signal of the NTSC system shown in FIG. 9 is supplied to the ALUs 531 to 53p for a display period of the image signal, and a program for performing the ghost removing processing function in FIG. 11 is supplied to the ALUs 531 to 53p for a non-display period of the image signal. Thereby, the decode-processing of the image signal of the NTSC system and the ghost removing processing can be alternately carried out by use of the same image decoder DSP 23.

The following will explain a MUSE system as a television system, which is different from the NTSC system.

Figure 12:
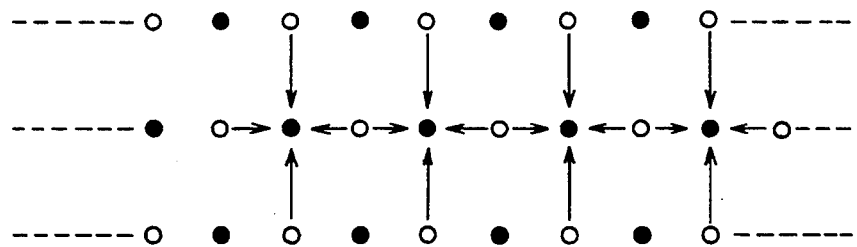
FIG. 12 is a view for explaining a transmission form of the image signal of MUSE system and an omitted interpolation processing of the pixel.

As shown in FIG. 12, in the case of MUSE system, a pixel shown by a white circle and a pixel shown by a black circle are alternately transmitted for every frame. In the case of the static image, two frames are combined and a signal is restored, and in the case of the dynamic image, only image data of each frame is used and the missed pixel is interpolated. In other words, in the case of MUSE system, it is necessary to perform the corresponding signal processing as the dynamic image and the static image are discriminating, thus, the signal processing is extremely complicated.

Figure 13:
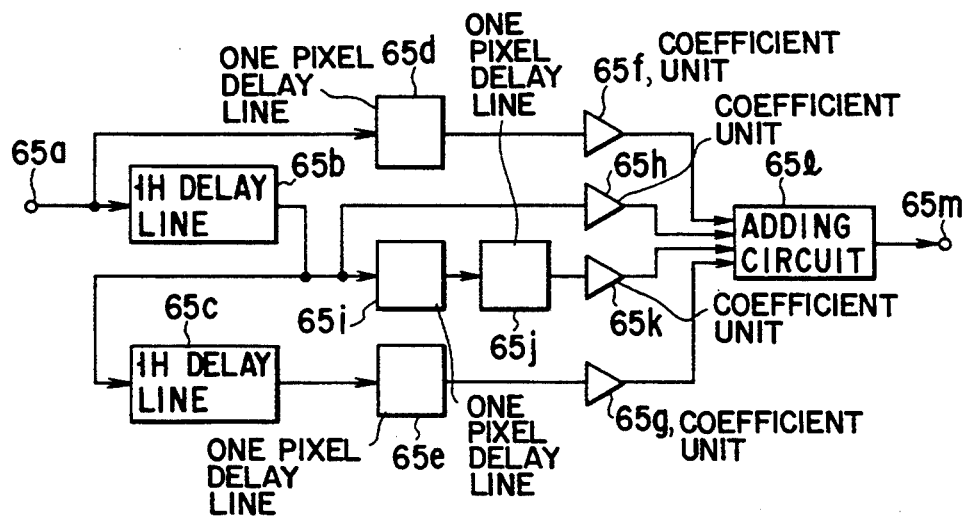
FIG. 13 is a block diagram for explaining decode processing means of the MUSE system image signal by use of the ALU by a functional expression.

In the television receiver for decoding the image signal of the MUSE system, it has been considered that the image is regenerated by only the signal processing of the dynamic image and the structure is simplified so as to reduce the manufacturing cost. FIG. 13 is a block diagram for explaining processing means, in which the decode-processing of such a simple MUSE system image signal is performed by use of the ALUs 531 to 53p, by a functional expression.

A MUSE system image signal supplied to an input terminal 65a is digitized. Digitized data is inputted to 1 H delay lines 65b and 65c, which are connected in series, and 1 H-delayed and 2 H-delayed. Inputted data and 2 H-delayed data are supplied to one pixel delay lines 65d and 65e, respectively, and are thereby one pixel-delayed. The one pixel-delayed data is then supplied to coefficient units 65f and 65g, and wighting processing is provided thereto.

1 H-delayed data is weighted by a coefficient unit 65h and is supplied to one pixel delay lines 65i and then 65j which causes a two pixel-delay. The two pixel-delayed data is then weighted by a coefficient unit 65k. The outputs of the coefficient units 65f, 65g, 65h, and 65k are supplied to an adding circuit 651, and added, so that-the interpolation processing for the pixels is performed as shown by the arrows of FIG. 12 and processed data can be received from an output terminal 65m.

Due to this, a program for performing the decode processing function of the NTSC system image signal shown in FIG. 9 and a program for performing the decode-processing function of the MUSE system image signal shown in FIG. 13 are time-divisionally supplied to the ALUs 531 to 53p. Thereby, the decode-processing of the NTSC system image signal and that of the MUSE system image signal can be alternately performed by use of the same image decoder DSP 23.

The following will explain how the plurality of input image signals are time-divisionally decode processed by use of the same image decoder DSP 23 with reference to FIG. 2.

In this case, particularly, the problem lies in the point that the plurality of input image signals are not synchronized with one another. As mentioned above, the image signals supplied to the input terminals 421, 422, ..., 42n are level-controlled by clamp circuits 431, 432, ..., 43n, digitized by A/D converters 441, 442, ..., 44n, selected by a switch matrix circuit 54, and guided to shift registers 521, 522, ..., 52m.

At this time, A/D converters 441, 442, ..., 44n A/D-convert the image signal based upon each independent sample clock signal. The shift operation is performed based upon the independent sample clock signal which is synchronized with each inputted digital image data by the shift registers 521, 522, ..., 52m. Also, data transfer to the latch circuit L52 is performed based upon each independent horizontal sync signal which is synchronized with each inputted digital image data.

When the plurality of programs is stored in the program memory 54 is selectively supplied, ALUs 531, 532, 533, ..., 53p time-divisionally decode-process data outputted from each of the shift registers 521, 522, ..., 52m.

For example, the case that one MUSE broadcast and two NTSC broadcasts are simultaneously received is now considered.

In this case, three types of programs, that is, a program for decode-processing the MUSE signal supplied to the input terminal 421, a program for decode-processing the NTSC signal supplied to the input terminal 422 and, a program for decode-processing the NTSC signal supplied to the input terminal 432, are read from the program memory 33 through the program loader 34, and transferred to the program memory 54 to be written thereto. Three types of programs stored in the program memory 54 are time-divisionally supplied to ALUs 531, 532, ..., 53p.

Figure 14:
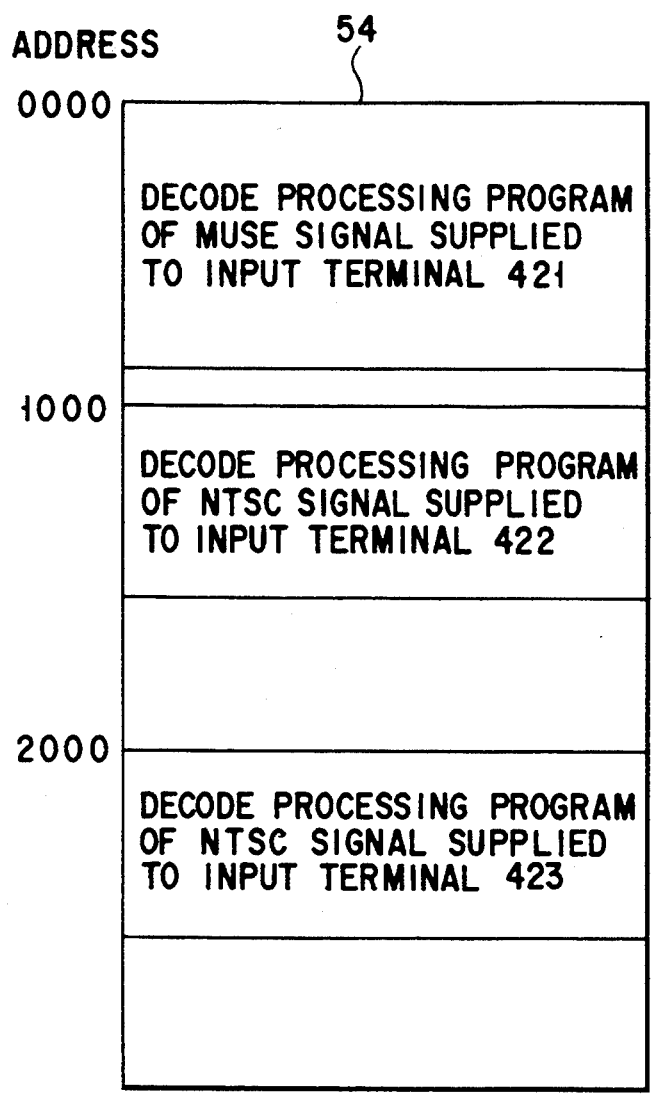
FIG. 14 is a view for explaining the state that a plurality of decode processing programs is written in a program memory used in the image decoder DSP.

For example, as shown in FIG. 14, the program for decode-processing the MUSE signal supplied to the input terminal 421 is stored from the address of 0000 (hexadecimal). The program for decode-processing the NTSC signal supplied to the input terminal 422 is stored from the address of 1000 (hexadecimal). The program for decode-processing the NTSC signal supplied to the input terminal 423 is stored from the address of 2000 (hexadecimal).

The CPU 35 discriminates which input terminal of the image decoder DSP 23 the television broadcast selected by the user is supplied to and which input terminal of the image decoder DSP 23 the broadcast receiving signal is supplied to. Then, the CPU 35 controls the program loader 34 based upon the result of the discrimination. In this case, the reason why the received two programs for decode-processing the NTSc image signal are written to the program memory 54 is due to the fact that the I/O registers and the addresses of the memory are to be used in decode-processing two NTSC broadcast. In other words, even in a case that the plurality of broadcast of the same television system is received, each program for decode-processing each broadcast must be transferred to the program memory 54.

It is required that digital image data for 1 H inputted to the shift registers 521, 522, ..., 52m be selectively supplied to the calculation unit 53 and that all data be calculated within 1 H.

Now, it is assumed that image signal 1 of MUSE system, and image signals 2 and 3 of NTSC system are inputted to the input terminals 421, 422, and 423, respectively, at arbitrary times as shown in FIGS. 15(A), 15(B), and 15(C). In this case, the respective image signals 1, 2, and 3 are supplied to the synchro DSP 27, and the horizontal signal is extracted, and supplied to the multipoint control unit 61. The 1 H-period of the image signal 2 and that of the image signal 3 are equal to each other, and the 1 H-period of the image signal 1 is substantially ½ of the 1-H period of the image signals 2 and 3.

If the horizontal sync signal of the image signal 1 is added to the multipoint control circuit 61 at time t1, a head address (0000 in FIG. 14) stored in the decode processing program of MUSE system image signal in the program memory 54 is supplied to the multipoint control circuit 61. The multipoint control circuit 61 sets the head address to a program counter 60. The program counter 60 operates the counting operation from the set head address. As a result, the decode-processing program of the MUSE system image signal is read from the program memory 54, and supplied to the ALUs 531, 532, 533, ..., 53p, thereby the decode-processing of an image signal 1 is started by timing shown in FIG. 15(D).

If a horizontal sync signal of an image signals 2 is added to the multipoint circuit 61 before time t2, which is prior to the completion of the decode-processing of the image signal 1 of 1 H, a head address (1000 in FIG. 14), which stores the decode-processing program of the NTSC system image signal of the program memory 54, is supplied to the multipoint control circuit 61 from an interrupt vector generating circuit 62. At this time, a signal showing that the ALUs 531 to 53p is working is supplied to the multipoint control circuit 61 from the calculating unit 53. Due to this, the multipoint control circuit 61 waits to set the head address (1000) to the program counter 60.

If the decode-processing of the image signal 1 for 1 H has ended by time t2, the signal showing that the ALUs 531 to 53p is working is not supplied to the multipoint control circuit 61 from the calculating section 53. Thus, the multipoint control circuit 61 sets the head address, which is supplied from the interrupt vector generating circuit 62, to the program counter 60. The program counter 60 starts the counting operation from the set head address. As a result, the decode-processing program of the NTSC system image signal is read from the program memory 54, and supplied to the ALUs 531 to 53m. Thereby, the decode-processing of an image signal 2 is started by timing shown in FIG. 15(D).

Similarly, if a horizontal sync signal of an image signal 3 is added to the multipoint circuit 61 before time t3, which is prior to the completion of the decode-processing of the image signal 2 for 1 H, a head address (2000 in FIG. 14), which stores the decode-processing program of the NTSC system image signal of the program memory 54, is supplied to the multipoint control circuit 61 from an interrupt vector generating circuit 62. At this time, a signal showing that the ALUs 531 to 53p is working is supplied to the multipoint control circuit 61 from the calculating unit 53. Due to this, the multipoint control circuit 61 waits to set the head address (2000) to the program counter 60.

If the decode-processing of the image signal 2 of 1 H has ended by time t3, the signal showing that the ALUs 531 to 53p is working is not supplied to the multipoint control circuit 61 from the calculating section 53. Thus multipoint control circuit 61 sets the head address, which is supplied from the interrupt vector generating circuit 62, to the program counter 60. The program counter 60 starts the counting operation from the set head address. As a result, the decode-processing program of the NTSC system image signal is read from the program memory 54, and supplied to the ALUs 531 to 53m. Thereby, the decode-processing of an image signal 3 is started by timing shown in FIG. 15(D).

As mentioned above, by sequentially changing the program to be supplied to the ALUs 531 to 53p, the plurality of image signals 1, 2, and 3 can be decode-processed for 1 H period continuously.

Figure 16:
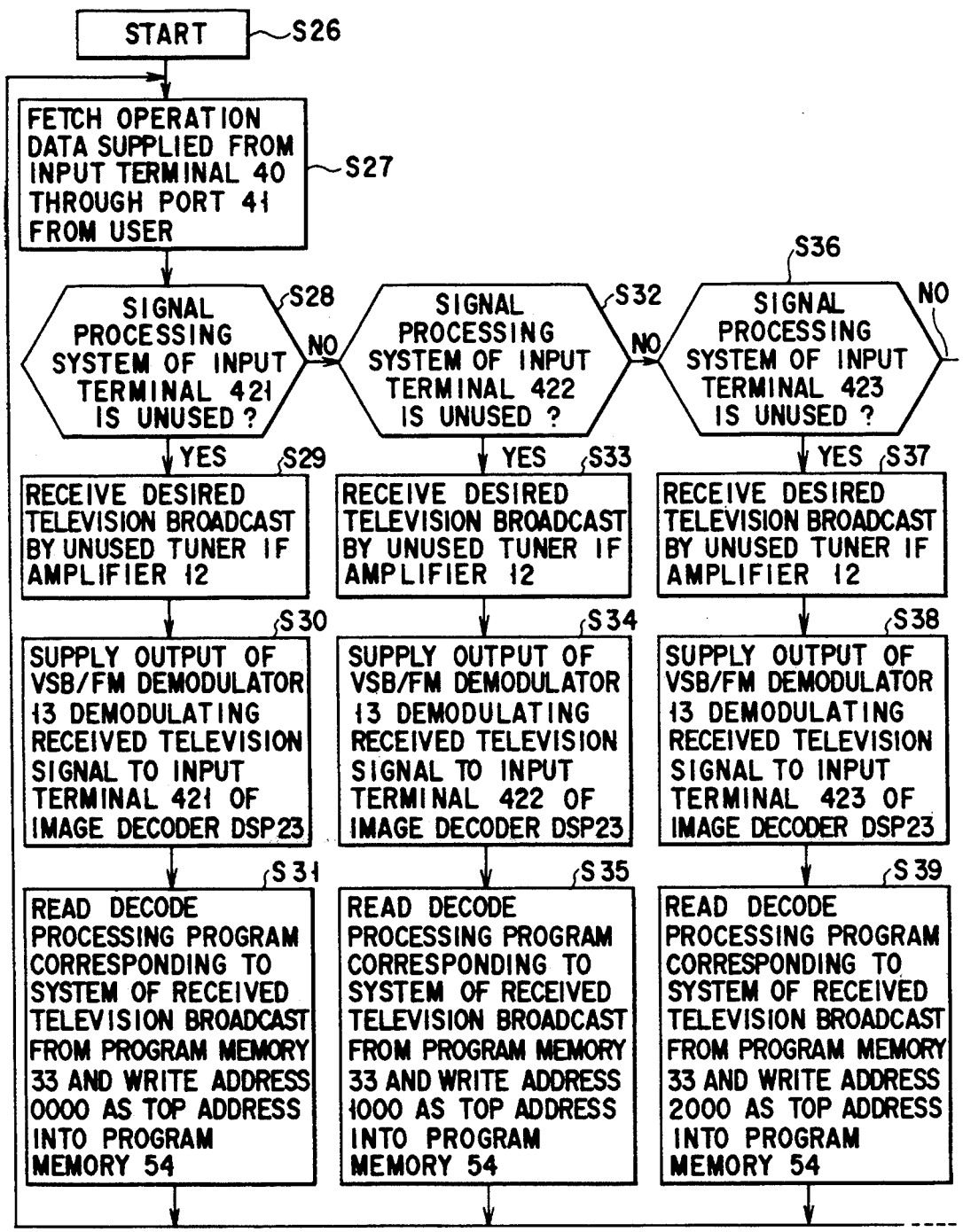
FIG. 16 is a flow chart for explaining an operation in which a plurality of decode processing programs is written in the program memory.

FIG. 16 is a flow chart showing the operation in which a desired program is read from the program memory 33 in accordance with the received television broadcast system and loaded to the program memory 54 of the image decoder DSP 23.

If the operation is started in step S26, the CPU 35 fetches operation data, which is sent from the input terminal 40 through the port 41 by user, in step S27. In step S28, the CPU 35 discriminates whether or not the signal processing system for decode-processing the image signal supplied to the input terminal 421 is unused in the image decoder DSP 23.

If it is discriminated that the signal processing system is unused (YES) in step S28, the CPU 35 receives a desired television broadcast by use of an unused tuner IF amplifier 12 selected from the tuner IF amplifiers 12 of the plurality of systems in step S29. In step S30, the CPU 35 controls the switch circuit 14 such that the output of the VSB/FM demodulator 13, which demodulates the image signal of the received television broadcast, is supplied to the input terminal 421 of the image decoder DSP 23. In step S31, the CPU 35 reads the decode-processing program, which corresponds to the system of the received television broadcast, from the program memory 33. Then, the CPU 35 controls the program loader 34 such that an address of 0000 (hexadecimal) is written to the program memory 54 is a head address, and the operation is returned to step S27.

If it is determined that the signal processing system for decode-processing the image signal supplied to the input terminal 421 is used in the image decoder DPS 23 (NO) in step S28, the CPU 35 determines whether or not the signal processing system for decode-processing the image signal supplied to the input terminal 422 is unused in the image decoder DSP 23.

If it is determined that the signal processing system is unused (YES) in step S32, the CPU 35 receives a desired television broadcast by use of an unused tuner IF amplifier 12 selected from the tuner IF amplifiers 12 of the plurality of systems in step S33. In step S34, the CPU 35 controls the switch circuit 14 such that the output of the VSB/FM demodulator 13, which demodulates the image signal of the received television broadcast, is supplied to the input terminal 422 of the image decoder DSP 23. In step S35, the CPU 35 reads the decode-processing program, which corresponds to the system of the received television broadcast, from the program memory 33. Then, the CPU 35 controls the program loader 34 such that an address of 0000 (hexadecimal) is written to the program memory 54 as a head address, and the operation is returned to step S27.

If it is discriminated that the signal processing system for decode-processing the image signal supplied to the input terminal 421 is used in the image decoder DSP 23 (NO) in step S32, the CPU 35 determines whether or not the signal processing system for decode-processing the image signal supplied to the input terminal 423 is unused in the image decoder DSP 23. If it is determined that the signal processing system is unused (YES) in step S36, the CPU 35 receives a desired television broadcast by use of an unused tuner IF amplifier 12 selected from the tuner IF amplifiers 12 of the plurality of systems in step S37. In step S38, the CPU 35 controls the switch circuit 14 such that the output of the VSB/FM demodulator 13, which demodulates the image signal of the received television broadcast, is supplied to the input terminal 423 of the image decoder DSP 23. In step S39, the CPU 35 reads the decode-processing program, which corresponds to the system of the received television broadcast, from the program memory 33. Then, the CPU 35 controls the program loader 34 such that an address of 2000 (hexadecimal) is written to the program memory 54 as a head address, and the operation is returned to step S27.

By repeating the above-explained processing, the reception of the plurality of television broadcasts and the decode-processing programs, which correspond to the respective received television broadcasts, are loaded to the program memory 54 of the image decoder DSP 23. Thereby, the plurality of image signals can be time-divisionally decode-processed by one image decoder DSP 23.

Figure 17:
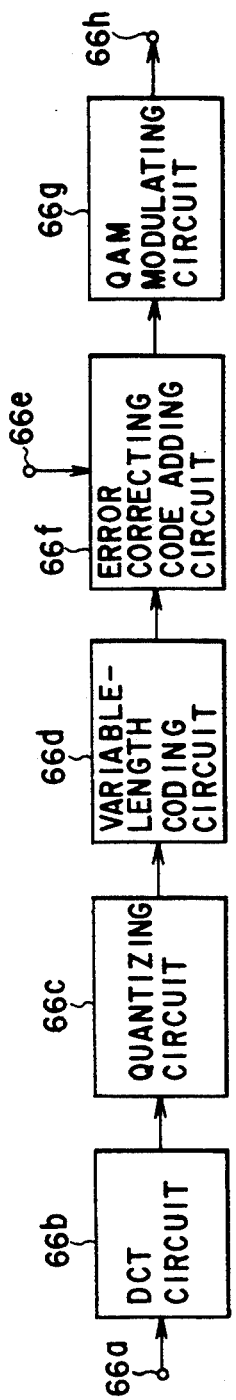
FIG. 17 is a block diagram for explaining an encoder system of a digital broadcast in which the image signal is encoded and compressed and transmitted.

Next, prior to the explanation of the reception of the digital broadcast, the outline of the digital broadcast will be explained as follows:

In the digital broadcast, the image is encoded, and the amount of data is compressed, so that data is transmitted. FIG. 17 shows an encoder system for such image encoding and compressing. Reference numeral 66a is an input terminal. Digital image data, which is obtained by converting an optical image of an object imaged by, for example, a camera, to an electrical image signal by a CCD (Charge Coupled Device) and A/D-converting the image signal, is supplied to the input terminal 66a.

Digital image data supplied to the input terminal 66a is supplied to DCT (Discrete Cosine Type) converting circuit 66b, and an orthogonal conversion processing which uses an orthogonal cosine function column, is provided by a two-dimensional pixel block unit having 8 pixels in a horizontal direction and 8 pixels in a vertical direction. After the orthogonal conversion processing is provided, data is supplied to a quantizing circuit 66c, and quantized. As a result, a bit accuracy is dropped. In this case, the quantizing circuit 66c does not directly drop the bit accuracy of digital image data. That is, the quantizing circuit 66c drops the bit accuracy of a high frequency component, whose deterioration is not easily shown.

By dropping the bit accuracy of the high frequency component, the possibility that a 0 will appear at a lower bit of pixel data is increased. By use of this property, Huffman coding is performed by a variable-length coding circuit 66d. Since a short code is allocated to a pattern, whose possibility of appearance is high due to Huffman coding, the reduction of the number of bits can be realized.

Huffman coding is a variable-length coding system in which the number of bits is reduced but the number of bits is unknown. Therefore, in order to make a transmission bit rate at the a transmission path constant, the accuracy of quantization of the quantizing circuit 66c is controlled in accordance with the amount of output bit after Huffman coding. In other words, the variable-length coding circuit 66d is formed of a Huffman coding circuit and a bit rate converting circuit using FIFO (First-in First-out).

The following will explain the coding rate in detail with reference to FIGS. 18(A) to FIG. 18(D).

Figure 18:
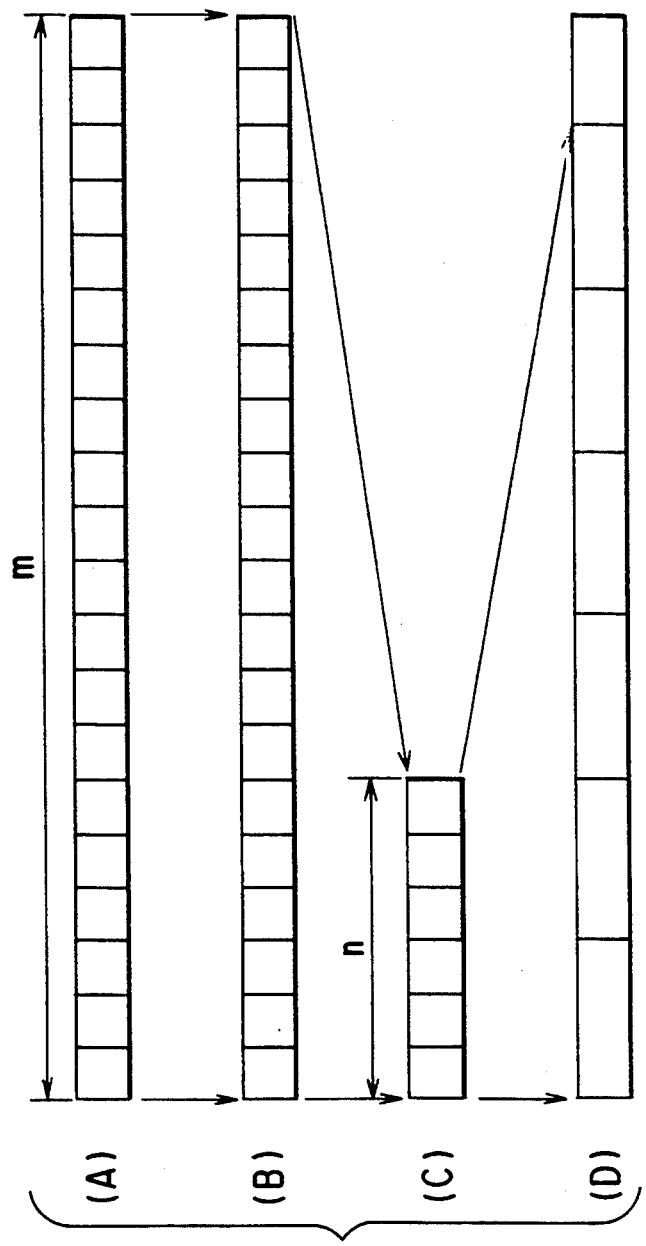
FIG. 18 explains a code rate in the digital broadcast, respectively.

If DCT calculation is provided in a state that the code rate of the digitized image signal is shown in FIG. 18(A), the data rate after calculation is shown in FIG. 18(B). In other words, at this point, the input data rate of DCT circuit 66b and the output data rate are the same. If Huffman coding is provided to output data of DCT circuit 66b, m number of data, after DCT, is reduced to n number of data as shown in FIG. 18(C). As shown in FIG. 18(D), by use of FIFO, the reduced number of data is transmitted to be time-extended to the same extent as the period of the original m number of data, so that the time rate is reduced.

The output of the variable-length coding circuit 66d and digital voice data supplied to an input terminal 66e are supplied to an error correcting code adding circuit 66f, where an error correcting is added. Output data of the error correcting code adding circuit 66f is supplied to an amplitude modulating QAM modulating circuit 66g, where a QAM modulating processing is provided, and the output is supplied to an output terminal 66h.

FIG. 19 shows a system for receiving a digital broadcast, that is, a decoder system of image coding and compression.

A QAM modulating signal, which is supplied to an input terminal 67a, is supplied to a QAM demodulating circuit 67b, and is demodulated. A bit string, which is obtained from a QAM demodulating circuit 67b, is supplied to an error correcting circuit 67c, and an error correction processing is provided. Thereafter, the bit string is separated into digital voice data and digital image data. Digital voice data is supplied to the voice DSP 20 shown in FIG. 1, and is data-processed. Digital image data is supplied to a variable-length decode circuit 67e, and is provided with an inverse processing of the process due to the variable-length coding circuit 66d on the side of the encoder.

In this case, output data of a variable-length decode circuit 67e has the same clock rate as that of digital image data supplied to the input terminal 66a on the side of the encoder. Output data of the variable-length decode circuit 67e is supplied to an inverse DCT circuit 67f, where an inverse calculation processing is provided, so that output data is restored to original digital image data, and is supplied to an output terminal 67g.

The DCT calculation processing and inverse DCT calculation processing explained above can be formed by combining a multiplying circuit and a cumulatively adding circuit. Moreover, since the input/output clock rates are the same and the processing is similar to the calculation of the filter in the processing of the NTSC system image signal, the hardware can easily be used in common. In other words, the inverse DCT calculation can be performed by ALUs 531 to 53p of the image decoder DSP 23.

FIG. 20 is a block diagram for explaining processing means in the case where the inverse DT calculation processing is performed by use of ALUs 531 to 53p by a functional expression. Data, which is supplied to an input terminal 68a, after variable-length decode-processing, is sequentially delayed by seven 1 H delay lines 691 to 697, which are connected in series. A coefficient is cumulatively added to each of the tap outputs of 1 H delay lines 691 to 697 by cumulative adders 701 to 708. The outputs of cumulative adders 701 to 708 are cumulatively added by adders 711 to 717, so that the inverse DCT calculation processing is ended, and the calculation result is supplied to the output terminal 68b.

The cumulative adder 701 sequentially delays input data by seven one-pixel delay lines 721 to 727, which are connected in series. Multipliers 731 to 738 multiply the tap outputs of one-pixel delay lines 721 to 727 by coefficients k0v to k7v, respectively. The outputs of the multipliers 731 to 738 are cumulatively added by adders 741 to 747. Regarding the other cumulative adders 702 to 708, since the structure and operation are the same as the cumulative adder 701, the explanation is omitted.

The inverse DCT calculation is performed for every pixel on i column and j row in a two-dimensional pixel block comparing 8 pixels in a horizontal direction and 8 pixels in a vertical direction in the DCT calculation. Regarding the coefficients k0v to k7v, the following values can be used.

$$Kuv = [\cos\{(2i + 1)u\pi/16\}] \cdot [\cos\{(2j + 1)v\pi/16\}] \cdot Cu \cdot Cv$$

$$u = 0 : Cu = 2^{-\frac{1}{2}} \quad v = 0 : Cv = 2^{-\frac{1}{2}}$$

$$u > 0 : Cu = 1 \quad V > 0 : Cv = 1$$

Figure 21:
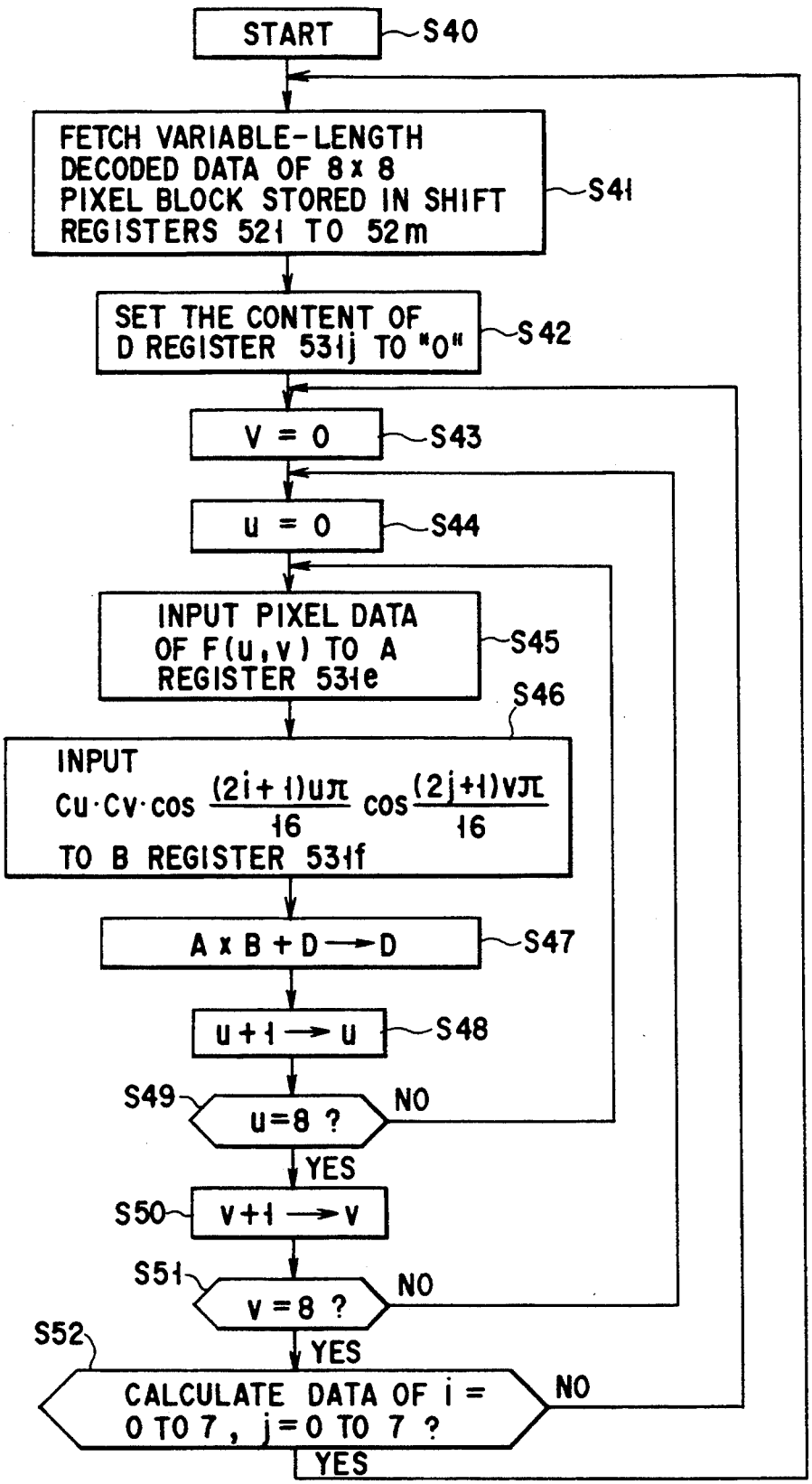
FIG. 21 is a flow chart for explaining the operation of the inverse DCT calculation processing means of the digital broadcast by use of inverse DCT calculation processing means.

FIG. 21 is a flow chart for explaining the operation of the inverse DCT calculation processing by use of ALUs 531 to 53p.

If the operation is started in step S40, ALUs 531 to 53p receive data, which is stored in shift registers 521 to 52m, in 8×8 pixel block after the variable-length coding decode-process in step S41. ALUs 531 to 53p set the content of D register 531j to 0 in step S42, and set the content to v=0 and u=0 in steps S43 and S44.

Then, in step S45, ALUs 531 to 53p input pixel data F(u, v) on u column and v row of data in DCT-calculated 8×8 pixel block to an A register 531e. In step S46, ALUs 531 to 53p input the following DCT inverse conversion formula to a B register 531f.

$$Cu \cdot Cv \cdot [\cos\{(2i+1)u\pi/16\}] \cdot [\cos\{(2j+1)v\pi/16\}]$$

In step S47, the content of A register 531e and that of B register 531f are multiplied by ALUs 531 to 53p, and the content of D register 531j is added to the multiplying result, and the adding result is inputted to a D register 531j.

In step S48, ALUs 531 to 53p set u to +1, and in step S49 ALUs 531 to 53p determine whether or note u=8. If u is not 8 (NO), ALUs 531 to 53p is returned to step S45. If u is 8 (YES), ALUs 531 to 53p set v to +1 in step S50, and ALUs 531 to 53p discriminates whether or not v =8 in step S51. If v is not 8 (NO), ALUs 531 to 53p is returned to step S44. If v is 8, ALUs 531 to 53p discriminate whether or not all inverse DCT calculation of respective pixel data of i=0 to 7 and j=- to 7 is ended in step S52. If the calculation is not ended (NO), ALUs 531 to 53p is returned to step S43. If the calculation is ended (YES), the operation is returned to step S41, thereby the inverse DCT calculation processing is performed for every 8×8 pixel block.

Presently, in the NTSC broadcast using the ground wave, the above-mentioned clear-vision broadcast is performed. There is a three-dimensional processing and a ghost removing processing which are used as a signal processing item of the clear-vision broadcast receiver.

Figure 22:
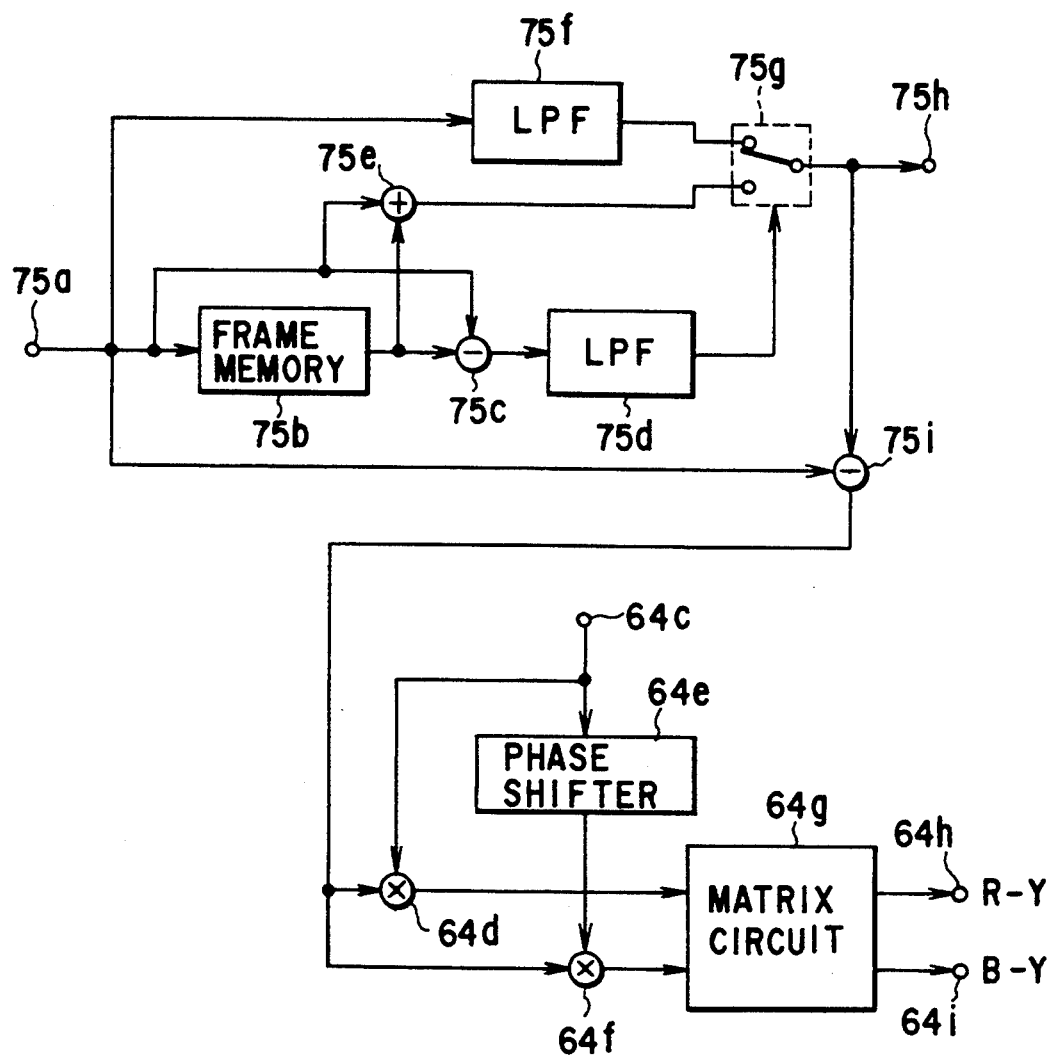
FIG. 22 is a block diagram for explaining three-dimensional decode processing means of the NTSC system image signal by use of the ALU by a functional expression.

FIG. 22 shows the means for performing a three-dimensional signal processing by use of ALUs 531 to 53p by a functional expression. The same reference numerals are added to the same portions as in FIG. 9. A reference numeral 75a is an input terminal. Data in which the image signal of NTSC system is digitized is supplied to the input terminal 75a. The difference between image data supplied to the input terminal 75a and data delayed by one frame by a frame memory 75b is calculated by a subtracter 75c. From the calculation result of the subtracter 75c, a component of the color signal is removed by a low pass filter (LPF) 75d so that a dynamic detection signal can be obtained.

Digital image data, which is supplied to the input terminal 75a, and data, which is delayed by one frame by the frame memory 75b, are added by an adder 75e. Thus, in the case of the dynamic image, no color signal is included in output data of the adder 75e. At the same time, the images in two frames are superimposed on each other since they are static images. Since the images are not filtered in the horizontal and vertical directions, resolution is extremely high.

Digital image data, which is supplied to the input terminal 75a, is supplied to an LPF 75f. Thus, in the case of the dynamic image, the color signal is removed, and a luminance signal Y can obtained. Output data of the adder 75e and output data of LPF 75f are selected by a switch 75g, and are supplied to an output terminal 75h. The switch 75g is changed in accordance with the output of the LPF 75d, that is, the static image or the dynamic image. In the case of the static image, the switch 75g is changed so as to guide output data of the adder 75e to the output terminal 75h. In the case of the dynamic image, the switch 75g is changed so as to guide output data of LPF 75f to the output terminal 75h. Thereby, the three-dimensional signal processing is performed.

The difference between digital image data, which is supplied to the input terminal 75a, and data, which is guided by the switch 75g, is calculated by a subtracter 75i. The calculation result of the subtracter 75i is supplied to the multiplying circuits 64d and 64f, so that color signals R-Y and B-Y can be generated.

Regarding the three-dimensional signal processing, even if a clear-vision broadcast is not performed on the broadcasting station side, the receiver can improve the quality of image by executing the above-mentioned calculation. If the receiver has sufficient ability for executing the three-dimensional signal processing, the number of calculations is increased as compared with the aforementioned basic processing of NTSC. However, it can be said that the three dimensional signal processing may be normally performed. FIG. 23 shows a state that the basic decode-processing program of NTSC system image signal and the three-dimensional decode-processing program are stored in the program memory 54.

FIG. 24 schematically shows the relationship of the amount of processing, which is necessary for various types of signal decode-processing, in the case that the processing ability of the image decoder DSP 23 is set to 28 GOPS (Giga Operation Per Second).

Now, it is assumed that an NTSC broadcast is received, and the image decoder DSP 23 performs the three-dimensional decoding processing. As a result, as shown in A of FIG. 24, in the three-dimensional decode-processing, the image decoder DSP 23 is forced to use the processing ability of 23 GOPS. At this time, the image decoder DSP 23 uses 82% of all processing ability.

If other NTSC broadcast are newly received under this state, the CPU 35 will control the newly received NTSC broadcast to be three-dimensionally decode-processed. However, if two NTSC broadcasts are three-dimensionally decode-processed, the total amount of processing is 46 GOPS, and this value exceeds the maximum amount (28GOPS) of processing of the image decoder DSP 23. Due to this, as shown in B of FIG. 24, the CPU 35 will control the newly received NTSC broadcast by not the three-dimensional decode-processing but by the normal NTSC basic decode-processing instead, that is, the program having a small amount of processing.

However, the amount of the NTSC basic decode-processing is 9 GOPS. If 9 GOPS of the NTSC basic decode-processing is added to 23 GOPS of the three-dimensional decode-processing, the total amount of processing is 32 GOPS and this value also exceeds the maximum amount (28 GOPS) of processing of the image decoder DSP 23. Therefore, as shown in C of FIG. 24, the CPU 35 processes the NTSC broadcast, which is first received, by not the three-dimensional decode-processing but by the normal NTSC basic decode-processing instead. In other words, the CPU 35 changes the program to process the NTSC broadcast by the program having a small amount of processing. In this case, the total amount of processing is 18 GOPS, which is within the range of the maximum amount of processing of the image decoder DSP 23, that is, 28 GOPS, so that two NTSC broadcasts can be received.

In sum, until the amount of processing of the image decoder DSP 23 exceeds the maximum amount of the processing, the CPU 35 automatically selects the decode-processing program, which can decode-process the received television broadcast to have high resolution, even if the received television broadcast has a large amount of processing. In the case that the receiving signal is newly added, the CPU 35 first calculates the total amount of processing of the image decoder DSP 23 by which the newly added television broadcast is decode-processed to have high resolution. Then, in the case that the total amount of processing of the image decoder DSP 23 exceeds the maximum amount of processing, the CPU 35 changes the program to process the already-received television broadcast by the program having a small amount of processing, so that the plurality of television broadcasts can be received.

Figure 25:
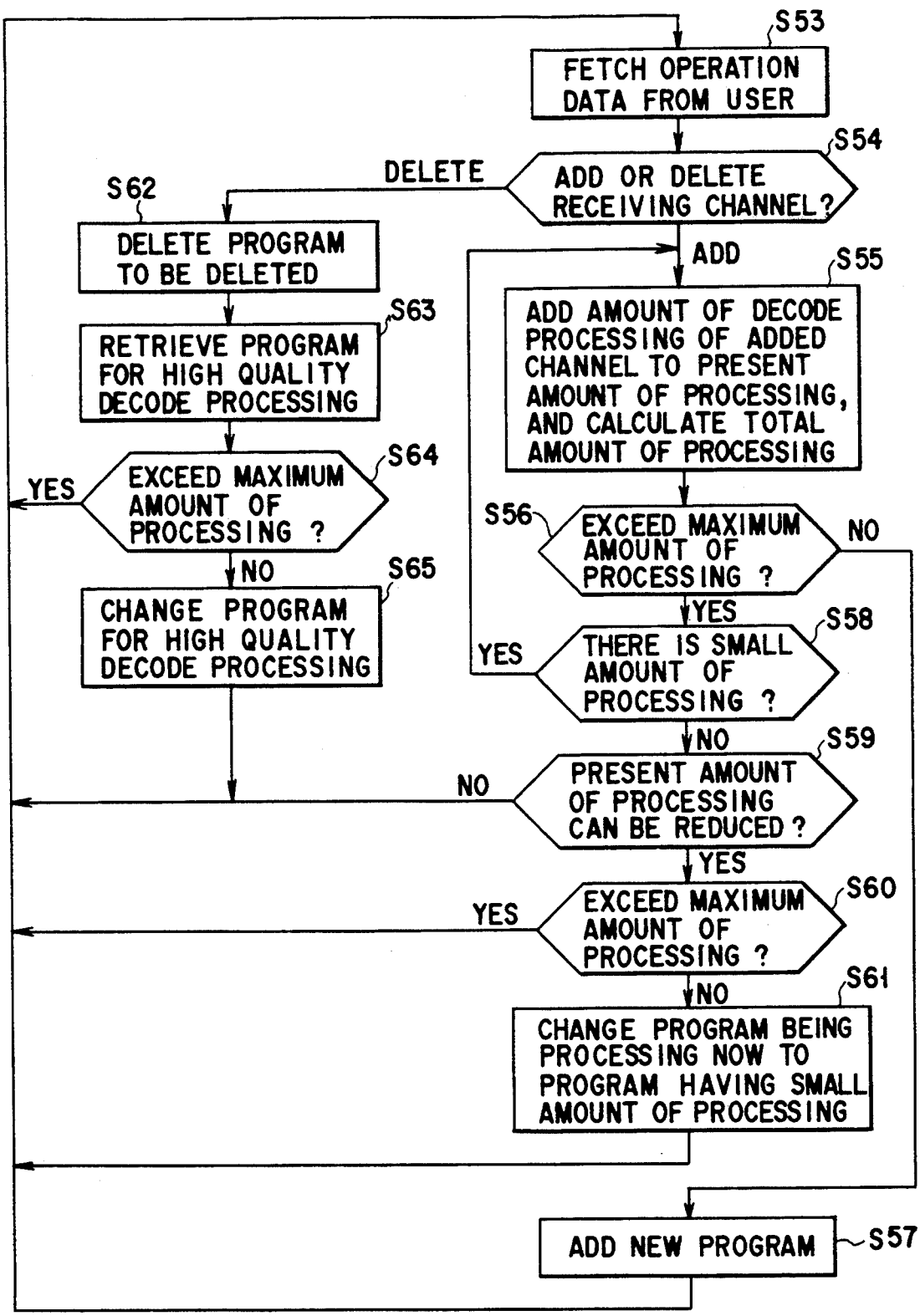
FIG. 25 is a flow chart for explaining the switching operation of the decode processing program in accordance with the decode processing ability of the image decoder DSP.

FIG. 25 is a flow chart showing the switching operation of the above-explained decode-processing program.

In step S53, the CPU 35 fetches operation data, which is sent from the input terminal 40 through the port 41 by user. In step S54, the CPU 35 determines whether the receiving channel is added or deleted. If it is determined that the receiving channel is added, the CPU 35 adds the present amount of processing of the image decoder 23 and the amount of processing, which is necessary for decode-processing the added channel to calculate the total amount of processing of the image decoder DSP 23 in step S55. In step S56, the CPU 35 determines whether or not the total amount of processing of the image decoder DSP 23 exceeds the maximum amount of processing of the image decoder DSP 23.

If it is determined in step S56 that the total amount of processing of the image decoder DSP 23 does not exceed the maximum amount of processing of the image decoder DSP 23 (NO), in step S57, the CPU 35 adds a new program, which is necessary for decode-processing the added channel, to the program memory 54, and the operation is returned to step S53. In step S56, if the total amount of processing of the image decoder DSP 23 exceeds the maximum amount of processing of the image decoder DSP 23 (YES), in step S58, the CPU 35 determines whether or not there is a program having the smallest amount of processing in the programs, which is necessary for decode-processing the added channel. If it is determined that there is the program (YES), the operation is returned to step S55.

If it is determines that there is no program having the smallest amount of processing (NO) in step S58, the CPU 35 determines whether or not there is a program having the smallest amount of processing in the programs, which are now used for decode-processing, in step S59. If it is determined that there is no program (NO), the operation is returned to step S53 as an error. If it is discriminated that there is a program having the smallest amount of processing in step S59 (YES), the CPU 35 discriminates whether or not the total amount of processing of the image decoder DSP 23 exceeds the maximum amount of processing of the image decoder DSP 23 in step S60. If it is discriminated that the total amount of processing exceeds the maximum amount of processing (YES), the operation is returned to step S53 as an error.

If it is determined that the total amount of processing of the image decoder DSP 23 does not exceed the maximum amount of processing of the image decoder DSP 23 (NO) in step S60, the CPU changes the present used program for decode-processing to the program having the small amount of processing in step S61, and the operation is returned to step S53.

In the case that the deletion of the received channel is required in step S54, the CPU 35 deletes the decoding program for the received channel, whose deletion is required, from the program memory 54 in step S62. In step S63, the CPU 35 retrieves the program, which can perform the decode-processing to have high resolution even if the amount of processing of the residual received channel is large. In step S64, the CPU 35 determines whether or not the total amount of processing using the retrieved program exceeds the maximum amount of processing of the image decoder DSP 23. If it is determined that the total amount of processing exceeds the maximum amount of processing (YES), the operation is returned to step S53. In step S64, if it is discriminated that the total amount of processing does not exceed the maximum amount of processing (NO), the CPU 35 changes the program, which is sued for the present decode-processing to the decode-processing program for high resolution in step S65, and the operation is returned to step S53.

Thus, when the received channel is deleted, the residual received channel can be image-displayed with high resolution. The operations shown in the flow chart of FIG. 25 is basically controlled by the CPU 35. However, the determinations in steps S56, S58, S59, S60 and S64 may be performed as the operations, which are performed by the program loader 34.

As described above, the decoding program can be replaced by one for the three-dimensional decoding or the NTSC basic decoding. With the image signal processor of this invention it is possible to replace the decoding program for MUSE decoding and MUSE down-conversion, with another program. Various programs may be considered, with another program. Various programs may be considered for the purpose of decoding different amounts of image data. One program is designed to process a part of input image data, i.e., a spatial portion of a one-frame image. Another program is designed to process one of several fields of image data. In accordance with such programs used in combination, the decoding program may be replaced by another. To process only a part of the input image data, it suffices to store the image data into a memory, to read the image data therefrom, and to process the image data. This method can minimize the amount of data which the image decoder DSP 23 needs to process.

Figure 26:
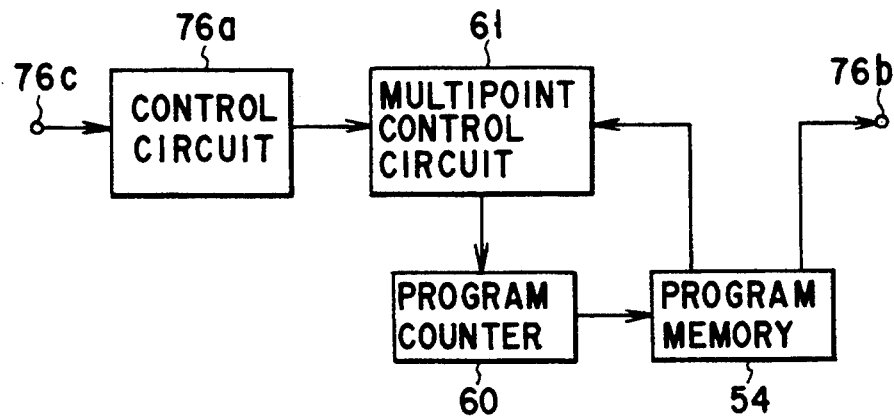
FIG. 26 is a block diagram for explaining other means for writing the decode processing program in the program memory in a functional expression.
Figure 27:
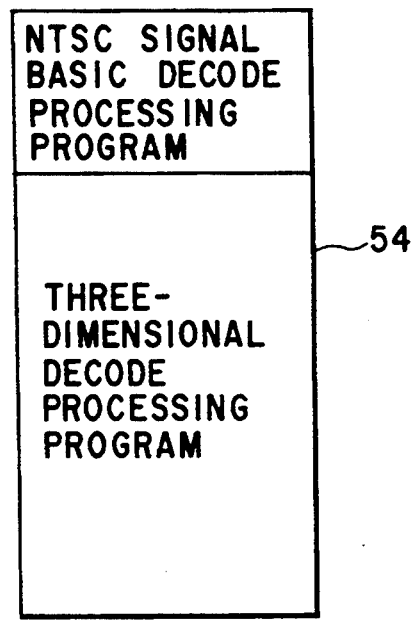
FIG. 27 is a view for explaining a state that the basic decode processing program and the three-dimensional decode processing program are written in the program memory.

In the embodiment described above, the decoding scheme is switched by replacing the program loaded in the program memory 54 with another program. Instead, the decoding scheme can be changed by use of, for example, a circuit as shown in FIG. 26. In this circuit, the program memory 54 stores a basic program for decoding NTSC image signals and a three-dimensional decoding program, as is illustrated in FIG. 27. When one NTSC broadcasting channel is received, the program counter 60 generates an address under the control of the control circuit 61. The address designates that region of the program memory 54 in which the three-dimensional decoding program is stored. The address is supplied to the program 54 through the multipoint control circuit 61 under the control of the circuit 61. Hence, the three-dimensional decoding program is read from the memory 54 and supplied to the ALUs 531, 532, . . . , 53p via the output terminal 76b. The ALUs 531, 532, . . . , 53p decodes the image data into data which represents a high-quality image.

Assume that the user selects another, or a second television channel, while receiving image data of the first channel. Then, the selection signal is supplied to the control circuit 76a through the input terminal 76c. The circuit 76a determines the amount of data to be processed, in the method illustrated in FIG. 25. If it determines that the sum of the data of the first channel and the data of the second channel exceeds the data-processing capacity of the image decoder DSP 23, the program counter 60 generates, through the multipoint circuit 61, an address in the region of the program memory 54 in which the NTSC basic decoding program is stored.

As a result, the NTSC basic decoding program is read from the memory 54 and supplied to the ALUs 531, 532, ..., and 53p via the output terminal 76b. The ALUs 531, 532, ..., 53p decodes the image data into such data in accordance with the NTSC basic decoding program.

Figure 28:
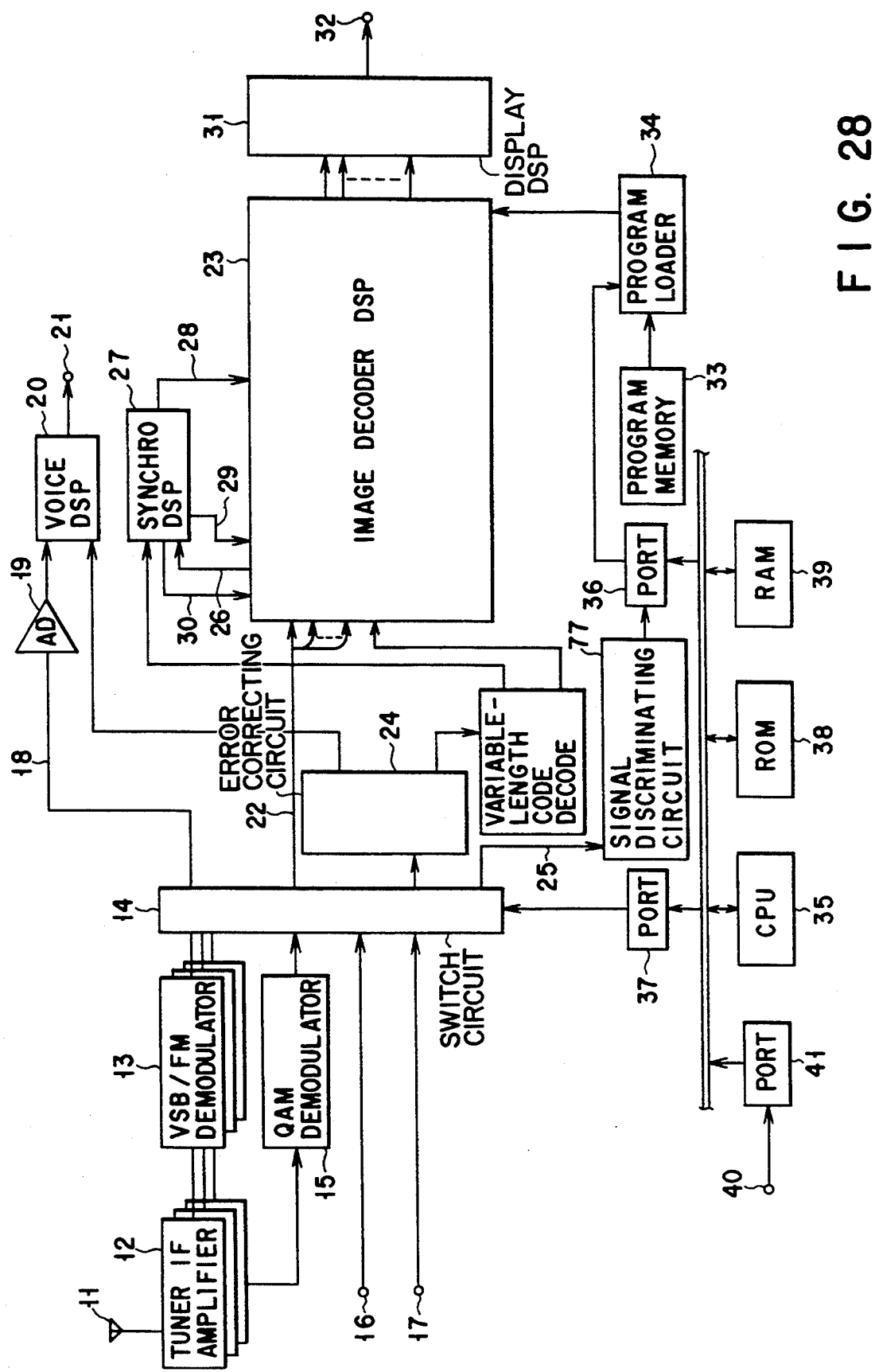
FIG. 28 is a block diagram for explaining a modification in which the embodiment of FIG. 1 is partially modified.

FIG. 28 shows a modification of the embodiment shown in FIG. 1. The modified embodiment is characterized in the following respects. The image signals outputted from the switch circuit 14 are supplied to the image decoder DSP 23 and also to the signal discriminating circuit 77. The circuit 77 determines the magnitude of the ghost in each input signal and generates a signal representing the magnitude of the ghost. The signal is supplied to the program loader 34. In accordance with this signal, the program loader 34 selects the program to be loaded into the image decoder DSP 23.

Figure 29:
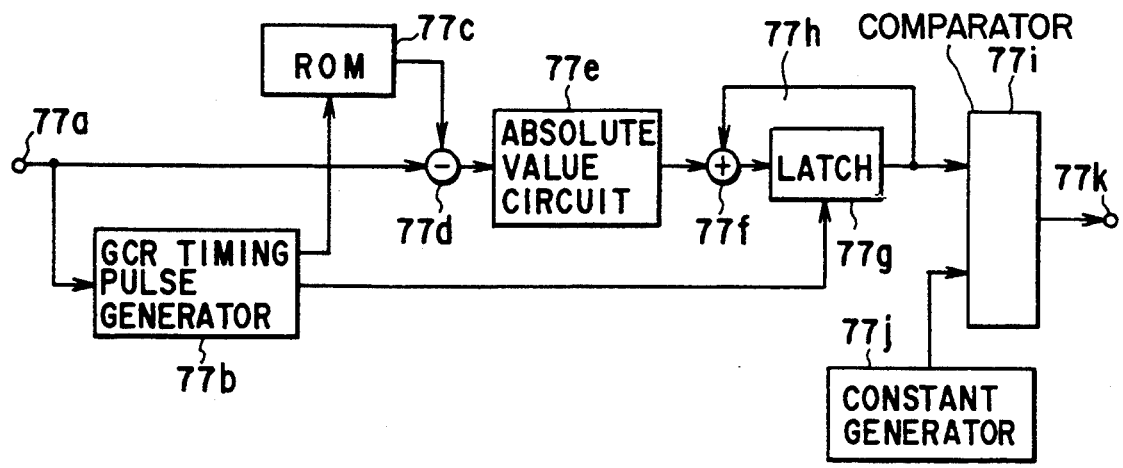
FIG. 29 is a block diagram for explaining the details of the signal discriminating circuit used in the modification.

The signal discriminating circuit 77 will be described in detail, with reference to FIG. 29. As shown in FIG. 29, the image signal outputted by the switch circuit 14 is supplied to an input terminal 77a and then to a GCR timing pulse generator 77b. From the image signal, the generator 77b detects the timing at which a GCR signal has been superposed. More specifically, the GCR timing pulse generator 77b generates ramp-wave data for an 1 H-period and outputs this data to a ROM 77c which stores GCR-rated wave data. In response to the ramp-wave data, the ROM 77c supplies the GCR-rated wave data to subtracter 77d. The subtracter 77d determines the difference between the GCR-rated wave data and the image signal supplied from the input terminal 77a, and produces data indicating the difference.

The output data of the subtracter 77d is supplied through an absolute value circuit 77e to an accumulative adder 77h which comprises an adder 77f and a latch circuit 77g. The accumulative adder 77h accumulates the output data of the absolute value circuit 77e for an 1 H-period. In the meantime, a GCR timing pulse generator 77b generates a pulse at the start of the line superposed with the GCR signal. This pulse is supplied to the latch circuit 77g, thereby resetting the latch circuit 77g. The output of the accumulative adder 77h is supplied to a comparator 77i. The comparator 77i compares the output of the accumulative adder 77h with the constant supplied from a constant generator 77j. A ghost discrimination signal which represents whether the ghost amount is greater than a prescribed value is generated from the difference obtained by the comparator 77i. The ghost discrimination signal is outputted from an output terminal 77k.

Figure 30:
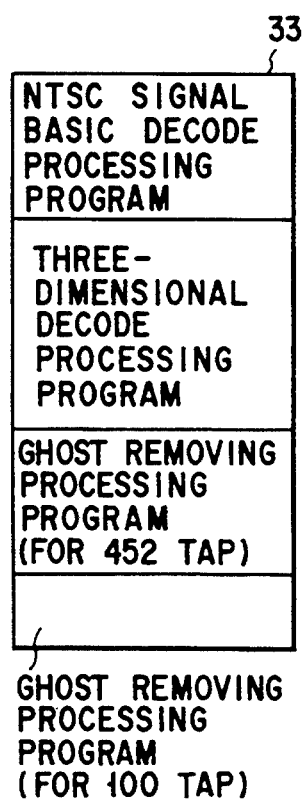
FIG. 30 is a view for explaining the type of the program to be sent to the image decoder DSP in the modification.

In the circuit of FIG. 28, a program memory 33 stores an NTSC basic decoding program, a three-dimensional decoding program, a code removing program for 452 taps (i.e., the taps on the delay lines T1, T2, ..., Tn shown in FIG. 11), and a ghost removing program for 100 taps, as shown in FIG. 30. The ghost removing program is designed for more data than the code removing program. The program memory 33 is connected to the program loader 34. The program loader 34 reads the programs from the memory 33 and loads them into the program memory 54 of the image decoder DSP 23, as will be explained with reference to the flow chart of FIG. 31.

As shown in FIG. 31, in step S66, the program loader 34 waits for a signal indicating that the user has switched the receiving channel to another, or a request for replacing the program in the memory 54 with another program. When the program loader 34 receives the signal, it determines in step S67 whether or not the amount of ghost exceeds a predetermined value. If Yes, the flow goes to step S68, in which the program loader 34 reads the NTSC basic decoding program and the code removing program for 452 taps from the program memory 33 and loads these programs into the program memory 54. Then, the flow returns to step S66. The amount of data to be subjected to the NTSC basic decoding is 9 GOPS, and the amount of data to be subjected to the code removing is 19 GOPS. The sum of these data amounts is 28 GOPS, thus, not exceeding the maximum data amount of 28 GOPS which the image decoder DPS 23 can decode.

If No is indicated in step S67, the operation goes to step S69 to form an image having high quality. In step S69, the program loader 34 reads the three-dimensional decoding program and the ghost removing program for 100 taps from the program memory 33. The amount of data subjected to the three-dimensional decoding is 23 GOPS, and the amount of data to be subjected to the ghost removing is 4.2 GOP. The sum of these data amounts is 27.2 GOPS, thus, not exceeding the maximum data amount (i.e., 28 GOPS) of the image decoder DSP 23.

As explained with reference to FIG. 31, when the user switches the receiving channel to another, the amount of the ghost is determined before the required programs are loaded into the program memory 54. Inevitably, it takes some time to display the image after the switching of the receiving channel. In order to shorten this time, the program loading may be performed in such a scheme as is shown in the flow chart of FIG. 32.

As illustrated in FIG. 32, in step S70, the program loader 34 waits for a signal indicating that the user has switched the receiving channel to another, or a request for replacing the program in the memory 54 with another program. When the program loader 34 receives the signal, the flow goes to step S71. In step S71, the program loader 34 loads the NTSC basic decoding program from the program memory 33 and loads these programs into the program memory 54, whereby the image decoder DSP 23 decode the input image data in accordance with the NTSC basic decoding program now stored in the memory 54. Then, in step S72, the program loader 34 determines whether or not the amount of ghost exceeds a predetermined value. If Yes, the flow goes to step S73, in which the program loader 34 reads the code removing program for 452 taps from the program memory 33 and loads these programs into the program memory 54. Then, the flow returns to step S70. If No in step S72, the operation goes to step S74 to form an image having high quality. In step S74, the program loader 34 reads the three-dimensional decoding program and the ghost removing program for 100 taps from the program memory 33. The flow then returns to Step S70. The amount of data subjected to the three-dimensional decoding is 23 GOPS, and the amount of data to be subjected to the ghost removing is 4.2 GOPS. The sum of these data amounts is 27.2

GOPS, not exceeding the maximum data amount (i.e., 28 GOPS) of the image decoder DSP 23.

In the program loading scheme of FIG. 32, the NTSC basic decoding program is unconditionally loaded into the program memory 54 when the receiving channel is switched to another, and the image decoder DSP 23 decodes the image data. Hence, an image can be displayed while the signal discriminating circuit 77 is determining the amount of the ghost.

Figure 33:
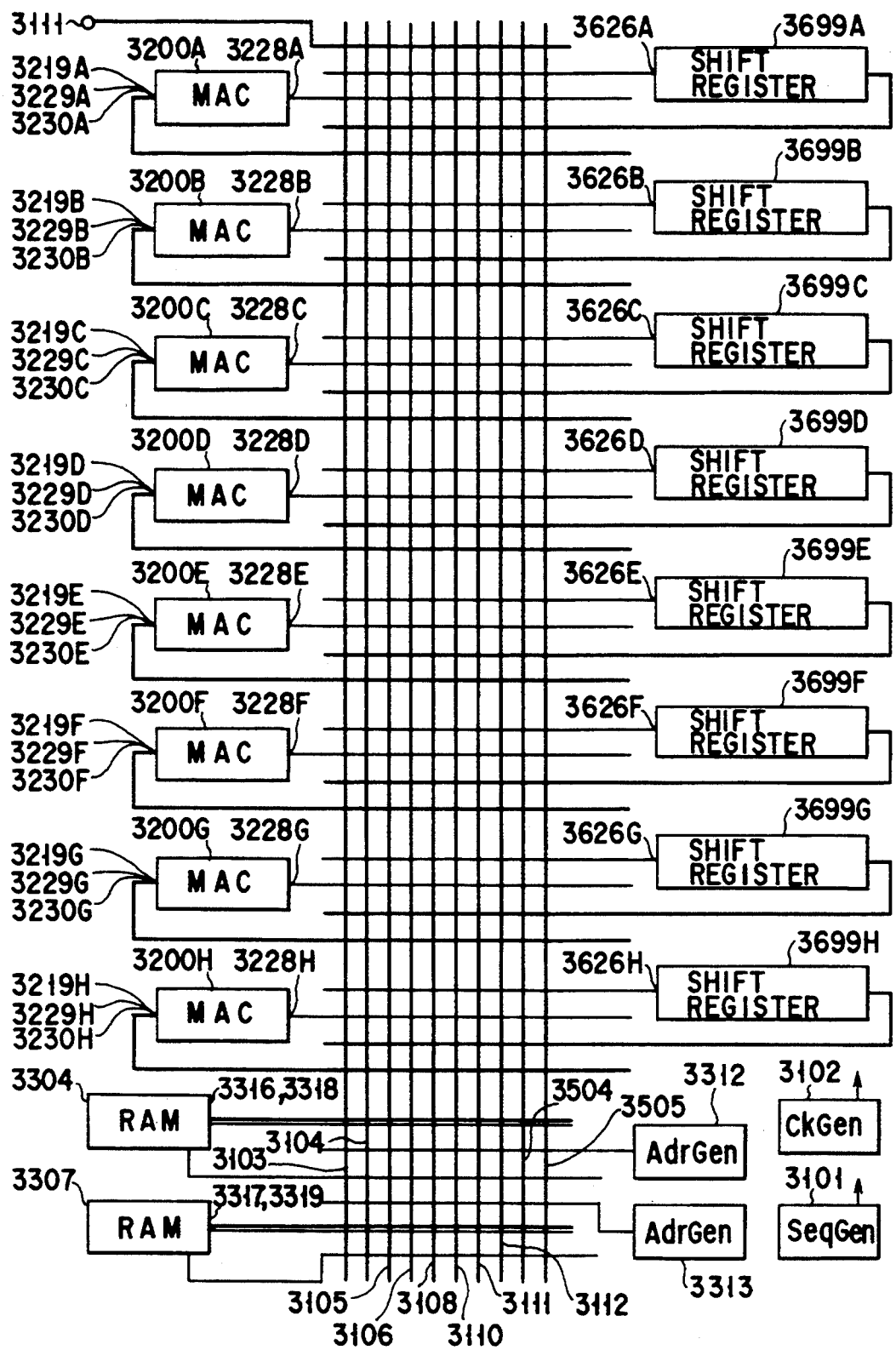
FIG. 33 is a block diagram for explaining an image decoder circuit in which the function having the same as the image decoder DSP used in the embodiment of FIG. 1 is realized by the other circuit structure.

FIG. 33 shows an image decoder circuit which performs the same function as the image decoder DSP incorporated in the embodiment of FIG. 1. The circuit shown in FIG. 33 is characterized in that the decoding scheme can be switched merely by operating a switch circuit, during digital broadcasting reception and NTSC broadcasting reception. The circuit can decode both digital broadcast data and NTSC broadcast data, without using a DSP which executes programs to decode image data.

As can be understood from FIG. 33, the image decoder circuit comprises eight MAC modules 3200A to 3200H, eight shift registers 3699A to 3699H each having a latch, RAMs 3304 and 3307, address generators 3312 and 3313, a sequence generator 3101, a clock generator 3102, bus line 3103 to 3106, and bus lines 3110 to 3112. The sequence generator 3101 and the clock generator 3102 control the MAC modules 3200A to 3200H, the shift registers 3699A to 3699H, and the address generators 3312 and 3313.

Signal lines extend from the MAC modules 3200A to 3200H, the shift registers 3699A to 3699H, the RAMs 3304 and 3307, and the address generators 3312 and 3313. The bus lines 3103 to 3106 and bus lines 3110 to 3112 are used to connect the signal lines in various combinations, the circuit can perform a variety of signal-processing functions. The signal-processing functions the circuit can perform by specific connections of the signal lines will be explained later.

The structural features of the MAC modules 3200A to 3200H will be described first. The MAC modules are identical, and only one of them will be described with reference to FIG. 34.

Figure 34:
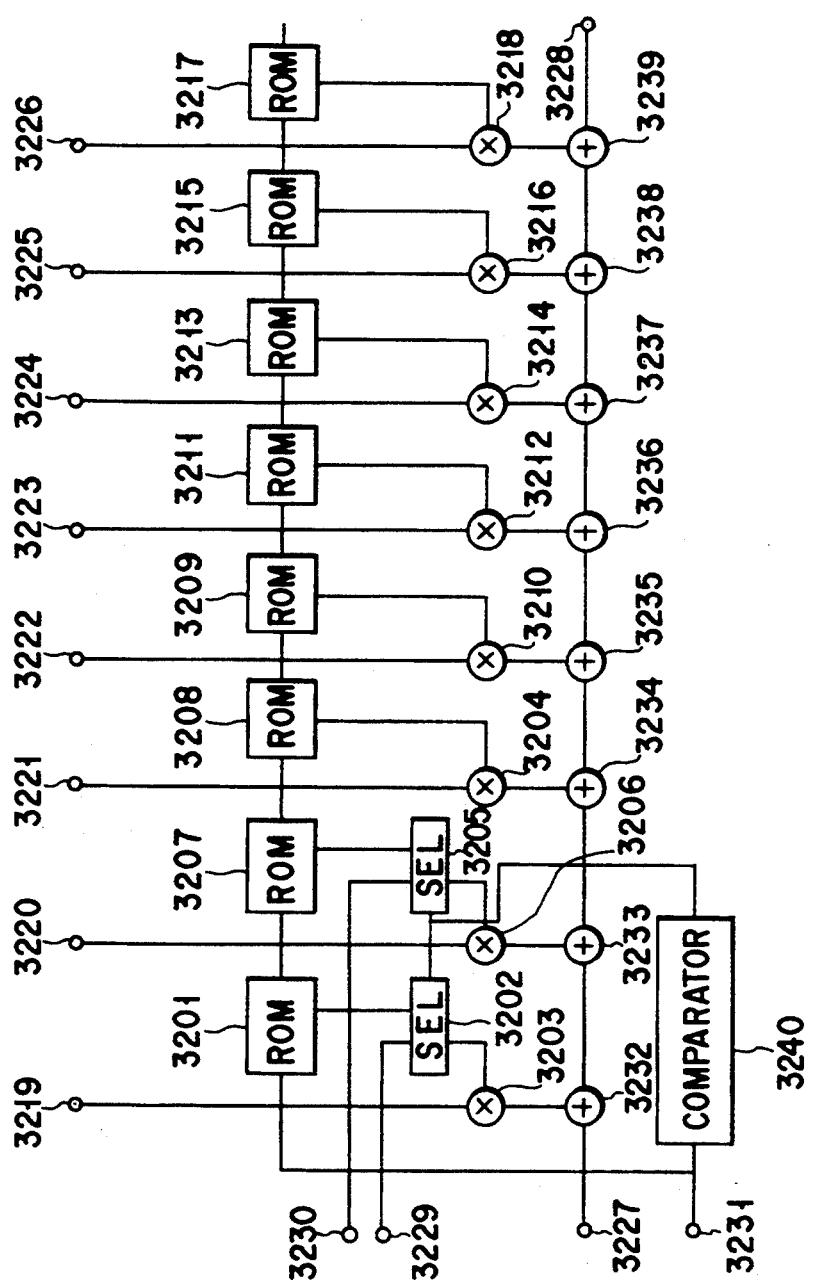
FIG. 34 is a block diagram for explaining the details of an MAC module used in the image decoder circuit of FIG. 33.

As shown in FIG. 34, each MAC module comprises ROMs 3201, 3207 to 3209, 3211, 3213, 3215 and 3217, multipliers 3203, 3204, 3206, 3210, 3212, 3214, 3216 and 3218, selectors 3202 and 3205, adders 3232 to 3239, and a comparator 3240. Although the MAC modules 3200A to 3200H are of the same structure, the ROMs of each MAC module store data items which are different from those stored in the ROMs of the other MAC modules.

The data items supplied to the input terminals 3219 to 3226 are multiplied by the data items stored in the ROMs 3201, 3206 to 3209, 3211, 3213, 3215 and 3217. The resultant products are added and accumulated. The sum of the data items can be added to the data supplied to an output terminal 3228 from any other MAC module. Hence, each MAC module can accomplish accumulative addition of eight taps or more.

An address value for the ROMs 3201, 3207 to 3209, 3211, 3213, 3215 and 3217 are supplied to an input terminal 3231. If the address value is "65," the comparator 3240 selects either the selector 3202 or the selector 3205. When selected, the selector 3203 supplies the data supplied to the input terminal 3229 to the multiplier 3203. When selected, the selector 3295 supplies the data supplied to the input terminal 3230 to the multiplier 3206. The multipliers 3203 and 3206 can multiply one signal by another, not a signal by a fixed data item.

Figure 35:
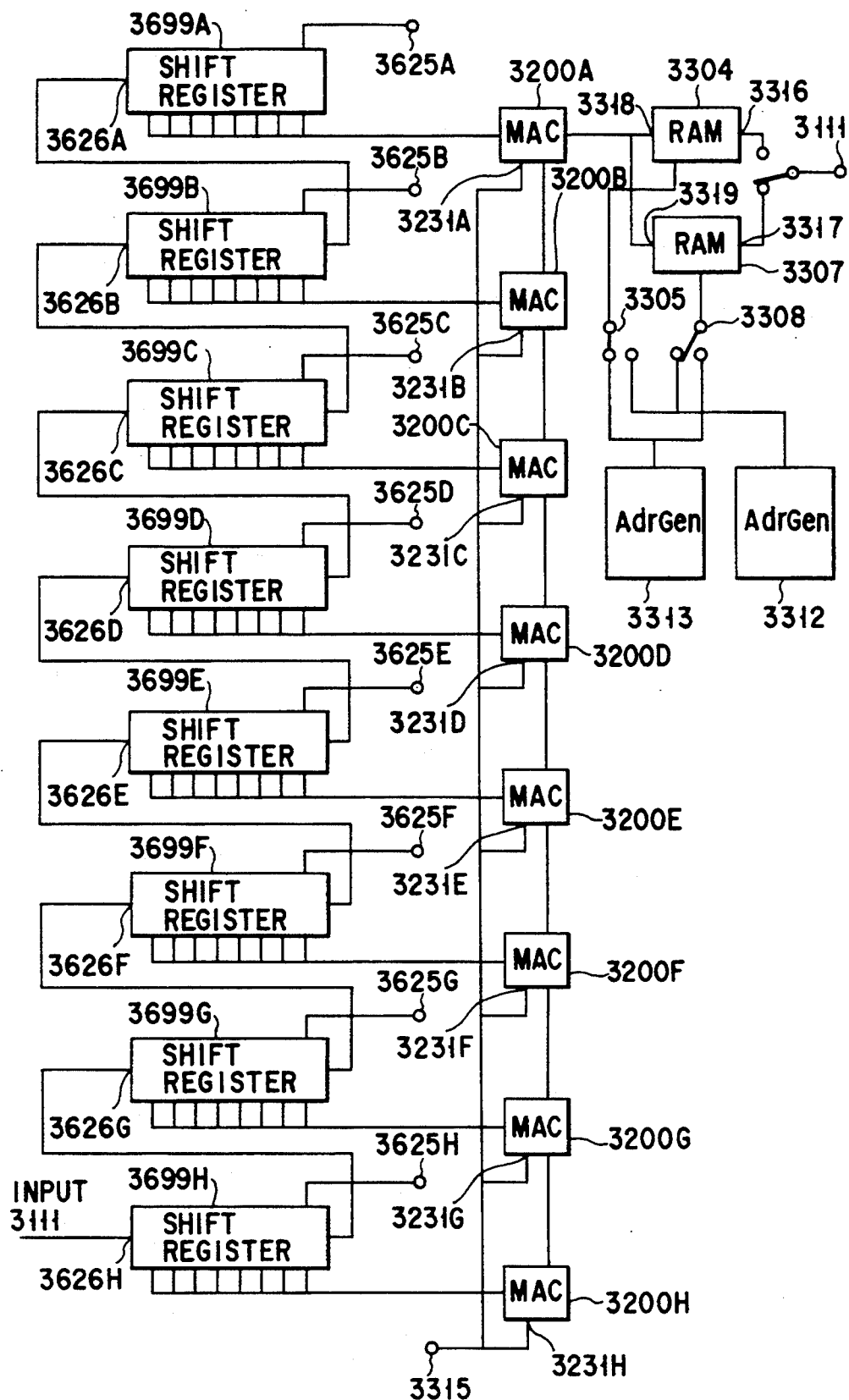
FIG. 35 is a block diagram for explaining a state that the image decoder circuit of FIG. 33 is set such that the inverse CDT calculation processing can be performed.

FIG. 35 illustrates a specific connection of the signal lines and the bus lines, which enables the circuit of FIG. 34 to achieve an inverse DCT calculation. The connection of the bus lines to the signal lines has been altered, so that the DCT-processed image data supplied to the input terminal 3111 may be supplied to the input terminal 3626H of the shift register 3699H. The output of the shift register 3699H is supplied to the input terminal 3626G of the next-stage shift register 3699G. In this manner, the data is supplied to the eight shift registers 3699H to 3699A, sequentially from one register to the next one.

The contents of the data will be described, with reference to FIGS. 36(A), 36(B), and 36(C). Data, which has been DCT-calculated in units of data blocks, each consisting of 8×8 pixels (i.e., 8 rows and 8 columns), is transferred in the form of 64 frequency components A11, A12, ..., A88. The second data, i.e., 64 frequency components B11, B12, ..., B88, and then third data, i.e., 64 frequency components C11, C12, ..., C88 are transferred. Two clock signals are supplied to each of the clock terminals 3625A to 3625H. The first clock signal is specific to each data, and the second clock signal to the 64 data blocks shown in FIG. 36(A). The first clock signal is supplied to the registers 3617 to 3624 of the shift registers 3699A to 3699H shown in FIG. 37, and the second clock signal is supplied to the latch circuits 3600 to 3607. Eight clock signals of the first type are supplied to the register 3617, 3618, ..., and 3624 incorporated in the shift register 3699A, 3699B, ..., 3699H, respectively. Eight clock signals of the second type are supplied to the latch circuit 3600, 3601, ..., and 3607, respectively.

When the 64 data blocks are supplied to the eight shift registers 3699A to 3699H, these shift registers store 64 frequency data items. Due to the clock signals of the second type, which have been supplied to the clock terminals 3625A to 3625H, the data items in the registers 3617 to 3624 are transferred to the latch circuits 3600 to 3607. In the same way, the registers 3617 to 3624 shift the data blocks of the next group.

Figures 37, 38:
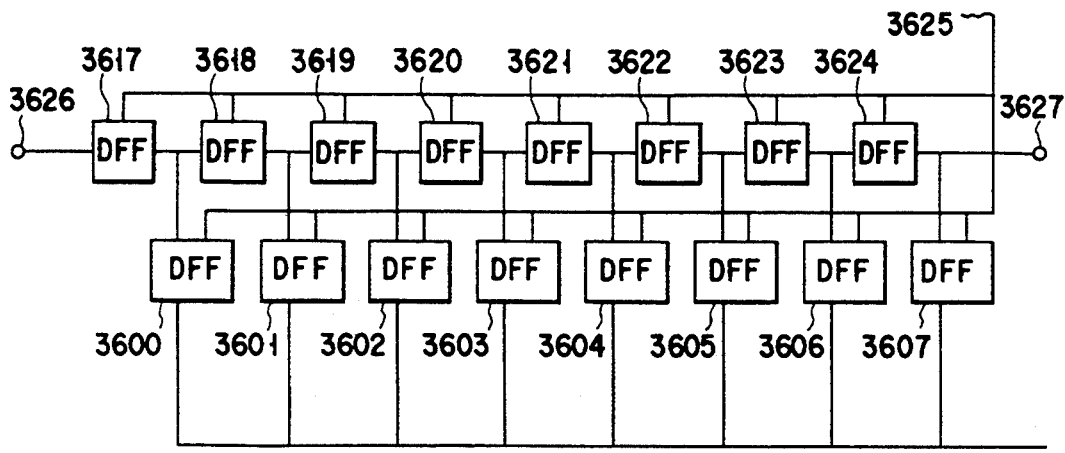
FIG. 37 is a block diagram for explaining the details of a shift register with latch used in the image decoder circuit of FIG. 33.
FIG. 38 is a view for explaining data stored in a ROM used in the image decoder circuit of FIG. 33.

The data items stored in the latch circuit 3600 to 3607 are supplied to the MAC modules 3200A to 3200H, respectively. The MAC modules 3200A to 3200H add and accumulate the data items, thus performing inverse DCT calculation on the input data items. The sequence generator 3101 supplies addresses "0" to "63" via the terminal 3315 to the ROM-address input terminals 3213A to 3231 H, whereby the COS table required for inverse DCT calculation is read out. The COS table has the contents which are illustrated in FIG. 38.

Figure 36:
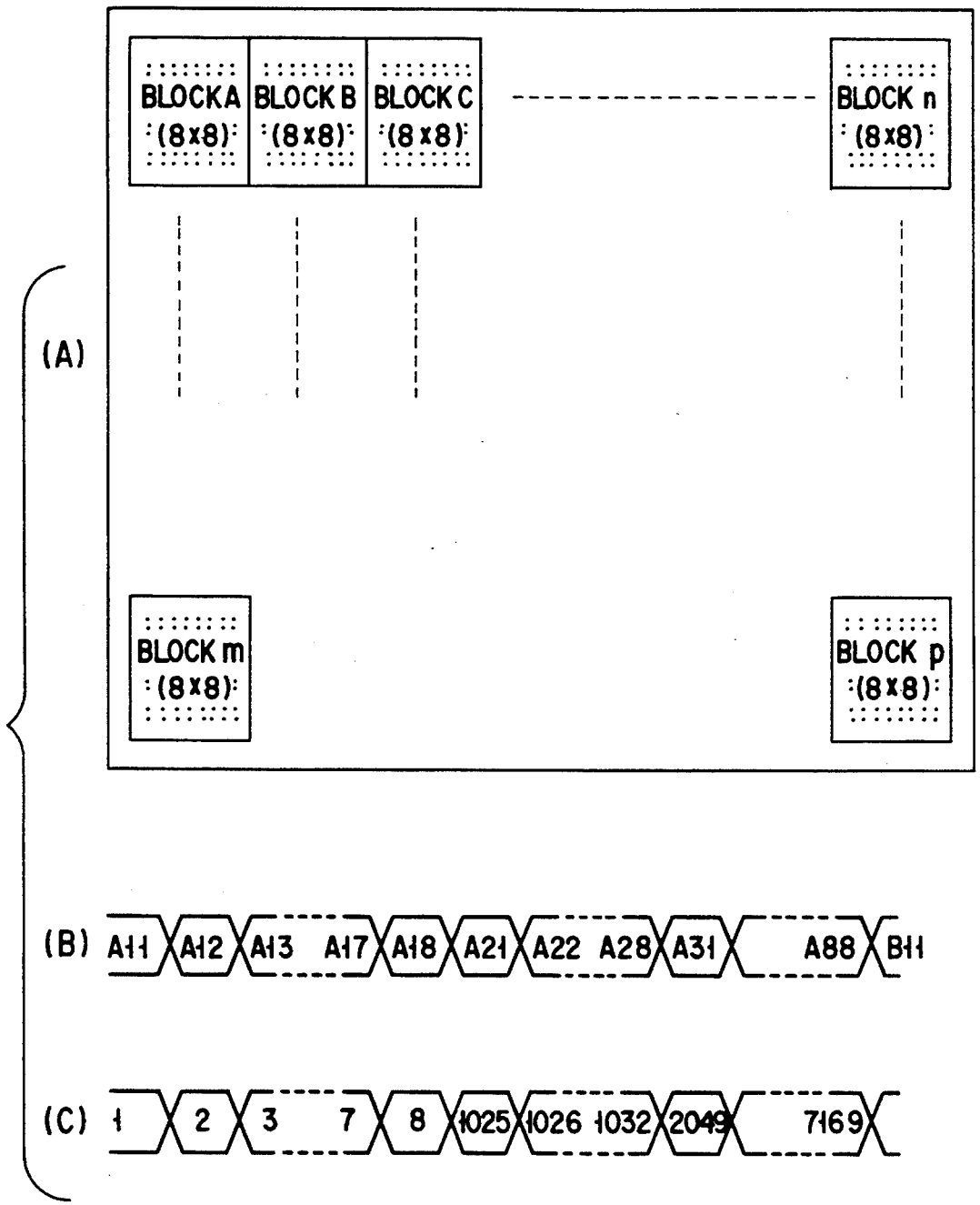
FIG. 36 explains an operation of the inverse CDT calculation processing in the image decoder circuit of FIG. 33, respectively.

The data obtained by the inverse DCT calculation is of the configuration shown in FIG. 36(B). As is evidence from FIG. 36(B), this data consists of discrete blocks. These data blocks need to be rearranged for scanning lines so that they may represent an image which can be displayed by a CRT. The block-rearranging process is accomplished by the use of the RAMs 3304 and 3307. The data items output by the MAC modules are supplied to the address input terminal 3316 of the RAM 3304, and the write addresses having the values shown in FIG. 36(C) are supplied to the address input terminal 3318 of the RAM 3304 from the address generator 3318. As a result, the data blocks for eight scanning lines are rearranged in the RAM 3304 so that they may represent an image that can be displayed.

Upon completion of writing the image data for eight scanning lines into the RAM 3305, the switches 3304 and 3308 are changed over, whereby the data is read from the RAM 3304, whereas data is written into the RAM 3307. Write addresses shown in FIG. 36(C) are supplied from the address generator 3312 to the RAM 3307 in the same order as the corresponding scanning lines. The RAM 3307 stores data blocks in the same way as the RAM 3304. Then, the switches 3305 and 3308 are changed over again, whereby the data is read from the RAM 3307, whereas data is written into the RAM 3304.

Thus, image data is written into the RAM 3304 while other image data is read from the RAM 3307, and then image data is written into the RAM 3307 while other image data is read from the RAM 3304.

Figure 39:
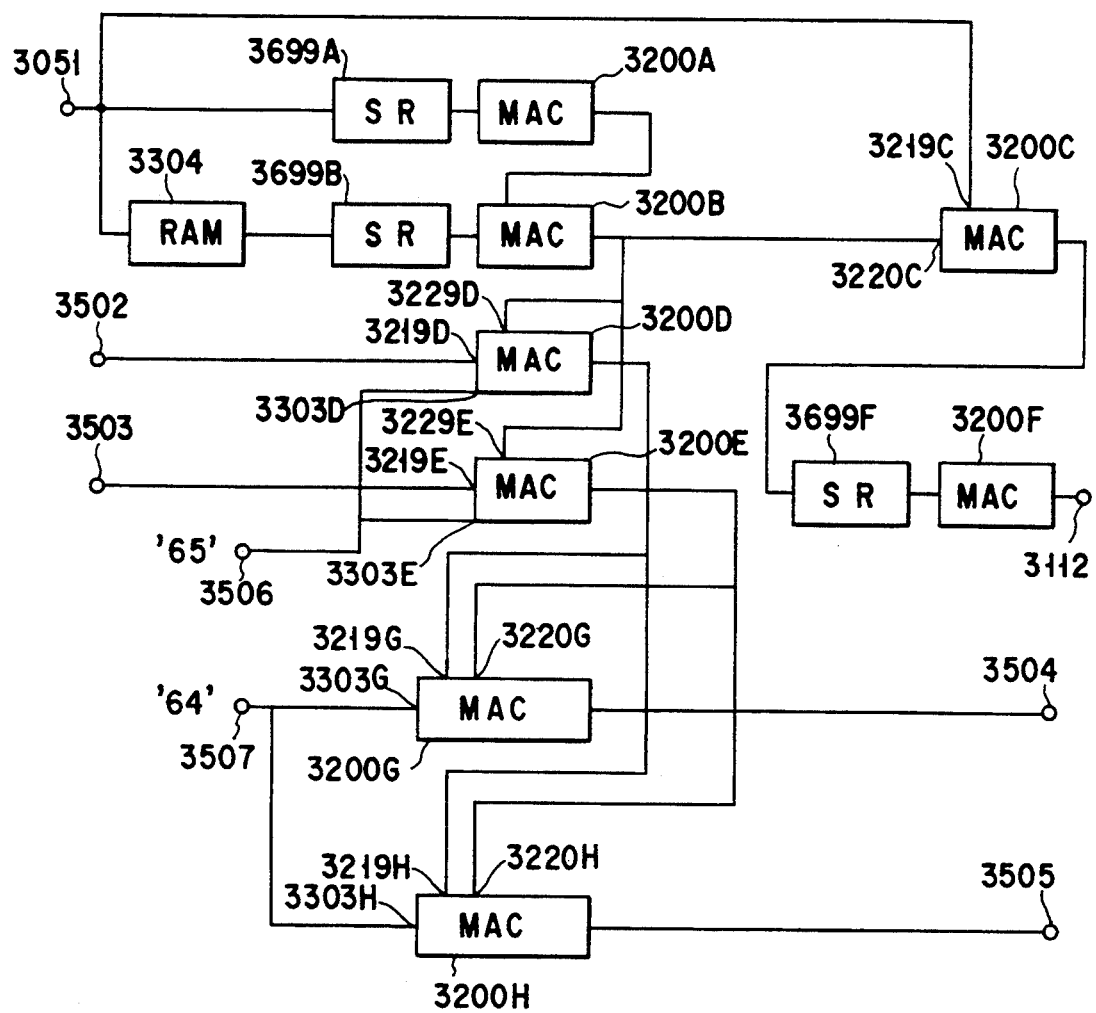
FIG. 39 is a block diagram for explaining a state that the image decoder circuit of FIG. 33 is set such that the decode processing of the NTSC system image signal.

FIG. 39 illustrates a specific connection of the signal lines and the bus lines, which enables the circuit of FIG. 34 to decode NTSC image signals. As can be understood from FIG. 39, NTSC image signals are supplied through a node 3051 to the RAM 3304 and the shift register 3699A having latches. A clock signal is input to the latch circuits 3600 to 3607 incorporated in the shift register 3699A, whereby the data items stored in the registers 3617 to 3624 are transferred.

The MAC module 3200A functions as accumulative adder for a transversal filter, extracting color signals. The RAM 3304 functions as delay circuit for delaying signals for one horizontal scanning period. Like the shift register 3699A and the MAC module 3200A, the shift register 3699B and the MAC module 3200B constitute a filter for extracting color signals. The ROMs of the MAC modules 3200A, 3200B, 3200C, 3200F, 3200G and 3200H store data items which are illustrated in FIG. 40.

The tap coefficient for the MAC module 3200A is inverse in sign with respect to the tap coefficient for the MAC module 3200A. The data output by the MAC module 3200A is supplied to the input terminal 3277B of the MAC module 3200B, and is thereby added to the results of calculation obtained in the MAC module 3200B. As a result, the difference between the color signal for one scanning line and the color signal for the next scanning line is calculated, whereby a modulated color signal is generated.

Two color sub-carriers, which have a 90° phase difference between them are supplied to the nodes 3502 and 3503. Hence, the MAC modules 3200D and 3200E demodulate color signals along two color axes, respectively. The MAC module 3200D functions as multiplier since a modulated color signal and a color sub-carrier are supplied to its input terminals 3229D and 3219D, respectively. Similarly, the MAC module 3200E functions as multiplier.

A constant "65" is supplied to the ROM-address input terminals 3303D and 3303E, controlling the selectors 3202 and 3205 such that the data items supplied from the external terminals 3229 and 3230 may be supplied to the multipliers 3203 and 3206, respectively. The MAC modules 3200G and 3200H perform color controlling and color-signal gain adjustment on two color difference signals. The ROM address value is fixed, or "64," and the values shown in FIG. 40 are read from the ROM.

The MAC module 3200C subtracts a color signal from an NTSC image signal. The data supplied to the terminal 3219C is multiplied by "−1," whereas the data supplied to the terminal 3220C is multiplied by "1." The resultant products are added together. Like shift register 3699A and the MAC module 3200A, the shift register 3699F and the MAC module 3200F constitute a transversal filter for performing edge emphasis on a luminance signal. The edge-emphasized luminance signal is output from the output terminal 3112.

As has been described, in the image decoder circuit of FIG. 33, the decoding scheme can be switched merely by operating a switch circuit, during digital broadcasting reception and NTSC broadcasting reception. The circuit can therefore decode both digital broadcast data and NTSC broadcast data, without using a DSP which executes programs to decode image data.

The present invention is not limited to the embodiments described above. Various changes and modifications can be made, without departing from the scope of the invention.

What is claimed is:

1. An image signal processor for processing a received image signal, said received image signal being at least one of an analog image signal and a digital image signal, said processor comprising:
   A/D converting means for converting said analog image signal into first digital image data;
   rate converting means for converting said digital image signal into second digital image data; and
   decoding means for selecting at least one of said first and second digital image data as input image data, and for decode-processing said input image data based upon a selected at least one of a plurality of processing programs, said selected at least one processing program corresponding to said selected at least one of said first and second digital image data.

2. The processor according to claim 1, wherein said processor further comprises:
   storing means for storing said plurality of processing programs, each corresponding to a type of image signal; and
   reading means for reading said selected at least one processing program from said storing means; and
   wherein said decoding means comprises decode-processing means for decode-processing said input image data based upon said selected at least one processing program read by said reading means.

3. The processor according to claim 2, wherein said decoding means further comprises a program memory for storing said selected at least one processing program read by said reading means, and wherein said decode-processing means performs said decode-processing based upon said selected at least one processing program stored in said program memory.

4. The processor according to claim 3, wherein said decode-processing means further comprises:
   a plurality of first shift registers, each first register selectively storing said input image data for a pre-selected period of time; and
   calculating means for time-divisionally receiving each of the input image data stored in said first shift registers, and for providing calculation processing of said input image data stored in said first shift registers, for said decode-processing, by time-divisionally supplying said selected at least one processing program stored in said program memory.

5. The processor according to claim 4, wherein said calculating means comprises:
   a plurality of calculation units for performing said calculation processing of said input image data stored in said first shift registers; and a plurality of memories for writing input/output data for said calculation units, each said memory being connected to a corresponding one of said calculation units.

6. The processor according to claim 5, wherein said decode-processing means further comprises:
a plurality of second shift registers, each for selectively receiving said calculation processed input image data; and
selecting means for selecting at least one of said input image data stored in said first shift registers and said calculation processed input image data stored in said second shift registers.

7. The processor according to claim 6, wherein said plurality of calculation units are disposed in a digital image processor.

8. The processor according to claim 6,
wherein said processing programs include a first processing program which is used for decode-processing said input image data when said input image data requires an amount of decode-processing which differs from an amount of processing required by said calculating means; and
wherein said decode-processing means further comprises setting means for setting a combination of said processing programs, which is to be time-divisionally supplied to said calculating means, said combination of said processing programs being set so as not to exceed a maximum amount of processing required by said calculating means during decode-processing.

9. The processor according to claim 8, wherein said processing programs include a second processing program which is used for decode-processing said input image data when said input image data is the same as said input image data stored in said first shift register, and a third processing program which is used for performing a high quality decode-processing.

10. The processor according to claim 9, wherein said second processing program is used for preforming a basic-decode-processing of an NTSC system image signal, and said third processing program is used for performing a three-dimensional decode-processing of said NTSC system image signal.

11. The processor according to claim 6, wherein said processing programs include a plurality of first processing programs which are used for decode-processing said input image data when said input image data requires an amount of decode-processing which differs from an amount of processing required by said calculating means, and a plurality of second processing programs which are used for providing an incidental signal processing of said decode-processed input image data when said input image data has been decode processed by said calculating means based upon any of said first processing programs; and
wherein said decode-processing means further comprises setting means for setting a combination of said first and second processing programs which is to be supplied to said calculating means, said combination of said first and second processing programs being set so as not to exceed a maximum amount of processing required by said calculating means during decode-processing, an image period of said input image data being decode-processed based upon any of said first processing programs and a non-image period of said input image data being decode-processed based upon any of said second processing programs.

12. The processor according to claim 11, wherein said first processing programs include a basic-decode-processing program which is used for decode-processing said input image data when said input image data is the same as said input image data stored in said first shift registers and a high resolution decode-processing program which is used for performing high resolution decode-processing, and wherein said plurality of second processing programs includes ghost removal processing programs which are used for providing a ghost removing process to said input image data stored in said first registers.

13. The processor according to claim 12, wherein said basic-decode-processing program is used for performing decode-processing of an NTSC system image signal, said high resolution decode-processing program is used for performing a three-dimensional decode-processing of said NTSC system image signal, and said ghost removal processing programs is used for ghost removing processing of at least one of a 452 tap and 100 tap.

14. The processor according to claim 11, wherein said setting means comprises discriminating means for determining a receiving state of said received image signal, for setting one of said second processing programs based upon a result of said discriminating means, and for setting one of said first processing programs so as not to exceed said maximum amount of processing required by said calculating means when one of said second processing programs is set.

15. The processor according to claim 14, wherein said setting means further includes means for supplying a predetermined at least one of said first processing programs to said calculating means in accordance with said result of said discriminating means.

* * * * *